US011689319B2

(12) United States Patent
Zhang et al.

(10) Patent No.: US 11,689,319 B2
(45) Date of Patent: Jun. 27, 2023

(54) CSI-RS CONFIGURATION FOR PARTIAL BAND RETUNING

(71) Applicant: Qualcomm Incorporated, San Diego, CA (US)

(72) Inventors: Yu Zhang, Beijing (CN); Wanshi Chen, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 231 days.

(21) Appl. No.: 16/614,592

(22) PCT Filed: Apr. 20, 2018

(86) PCT No.: PCT/CN2018/083863
§ 371 (c)(1),
(2) Date: Nov. 18, 2019

(87) PCT Pub. No.: WO2018/210098
PCT Pub. Date: Nov. 22, 2018

(65) Prior Publication Data
US 2020/0153552 A1 May 14, 2020

(30) Foreign Application Priority Data

May 17, 2017 (WO) ............. PCT/CN2017/084710

(51) Int. Cl.
*H04L 1/06* (2006.01)
*H04L 5/00* (2006.01)
(Continued)

(52) U.S. Cl.
CPC .......... *H04L 1/0693* (2013.01); *H04L 5/0051* (2013.01); *H04L 5/0092* (2013.01);
(Continued)

(58) Field of Classification Search
CPC ... H04L 5/0048; H04L 5/0051; H04L 5/0092; H04L 5/0094; H04L 5/0091; H04L 5/005;
(Continued)

(56) References Cited

U.S. PATENT DOCUMENTS

2003/0125040 A1* 7/2003 Walton ................. H04B 7/0626
455/454
2011/0170435 A1* 7/2011 Kim ..................... H04L 5/0048
370/252

(Continued)

FOREIGN PATENT DOCUMENTS

CN 103516464 A 1/2014
CN 103546208 A 1/2014
(Continued)

OTHER PUBLICATIONS

Intel Corporation: "Further Discussion on CSI-RS for NR", 3GPP Draft; 3GPP TSG RAN WG1 NR Ad-Hoc meeting, R1-1700351, 3rd Generation Partnership Project (3GPP), Mobile Competence Centre; 650, Route Des Lucioles; F-06921 Sophia-Antipolis Cedex; France, vol. RANWG1, No. Spokane, USA; Jan. 16, 2017-Jan. 20, 2017, Jan. 16, 2017 (Jan. 16, 2017), XP051207888, pp. 1-4, Retrieved from the Internet: URL: http://www.3gpp.org/ftp/Meetings_3GPP_SYNC/RAN1/Docs/, [retrieved on Jan. 16, 2017], paragraphs [0001], [02.2].

(Continued)

*Primary Examiner* — Joshua Kading
(74) *Attorney, Agent, or Firm* — Qualcomm Incorporated

(57) ABSTRACT

Methods, systems, and devices for wireless communication are described. A user equipment (UE) may receive a message indicating, for each or multiple partial bands, a set of possible channel state information reference signal (CSI-RS) configurations. The UE may further receive downlink control information (DCI) from a base station, which may indicate a set of downlink resource associated with a first (Continued)

partial band. The UE may select a first CSI-RS configuration from the set of possible CSI-RS configurations for the first partial band based on the DCI, and when the base station transmits CSI-RS, the UE may obtain CSI-RS measurements over the first partial band during the set of downlink resources using the selected first CSI-RS configuration.

28 Claims, 21 Drawing Sheets

(51) Int. Cl.
  H04W 72/23 (2023.01)
  H04W 72/53 (2023.01)
  H04W 80/02 (2009.01)
  H04B 7/06 (2006.01)
  H04W 76/27 (2018.01)
(52) U.S. Cl.
  CPC ........... *H04L 5/0094* (2013.01); *H04W 72/23* (2023.01); *H04W 72/53* (2023.01); *H04B 7/06* (2013.01); *H04W 76/27* (2018.02); *H04W 80/02* (2013.01)
(58) Field of Classification Search
  CPC ....... H04L 5/0007; H04L 1/0693; H04L 1/00; H04W 72/042; H04W 72/0493; H04W 76/27; H04W 80/02; H04B 7/06
  See application file for complete search history.

(56) References Cited

U.S. PATENT DOCUMENTS

| | | | |
|---|---|---|---|
| 2011/0244877 A1 | 10/2011 | Farajidana et al. | |
| 2013/0003788 A1* | 1/2013 | Marinier | H04B 7/0626 375/219 |
| 2013/0286964 A1* | 10/2013 | Chu | H04L 5/0035 370/329 |
| 2013/0336214 A1* | 12/2013 | Sayana | H04B 7/0632 370/328 |
| 2015/0023241 A1* | 1/2015 | Kim | H04L 5/005 370/312 |
| 2015/0341803 A1 | 11/2015 | Kim et al. | |
| 2016/0226649 A1* | 8/2016 | Papasakellariou | H04L 1/0001 |
| 2016/0359538 A1* | 12/2016 | Onggosanusi | H04L 5/0057 |
| 2018/0279289 A1* | 9/2018 | Islam | H04W 72/1242 |
| 2019/0173554 A1* | 6/2019 | Kwak | H04B 7/0639 |
| 2019/0230549 A1* | 7/2019 | Wang | H04B 7/0617 |
| 2019/0245603 A1* | 8/2019 | Yum | H04B 7/0617 |
| 2019/0253282 A1* | 8/2019 | Hadaschik | H04L 25/0204 |
| 2019/0342782 A1* | 11/2019 | Yum | H04W 72/0413 |
| 2019/0372642 A1* | 12/2019 | Kakishima | H04L 5/0053 |
| 2020/0052804 A1* | 2/2020 | Hao | H04B 17/364 |
| 2020/0052868 A1* | 2/2020 | Zhang | H04L 5/0057 |
| 2020/0059951 A1* | 2/2020 | Frenne | H04L 5/0023 |
| 2020/0084787 A1* | 3/2020 | Hao | H04W 72/044 |
| 2020/0196316 A1* | 6/2020 | Zhang | H04L 5/0044 |

FOREIGN PATENT DOCUMENTS

| | | | |
|---|---|---|---|
| CN | 104038312 A | 9/2014 | |
| WO | WO-2010128836 A2 | 11/2010 | |
| WO | WO 2014126311 A1 | 8/2014 | |
| WO | WO-2014139303 A1 * | 9/2014 | ............... H04B 7/04 |
| WO | WO 2016048055 A1 | 3/2016 | |
| WO | 2016064317 A1 | 4/2016 | |
| WO | WO 2016160126 A1 | 10/2016 | |
| WO | WO-2016163819 A1 | 10/2016 | |
| WO | WO 2017026794 A1 | 2/2017 | |

OTHER PUBLICATIONS

Supplementary European Search Report—EP18802986—Search Authority—The Hague—Jan. 21, 2021.

International Search Report and Written Opinion—PCT/CN2017/084710—ISA/EPO—dated Aug. 2, 2017.

International Search Report and Written Opinion—PCT/CN2018/083863—ISA/EPO—dated Oct. 18, 2018.

Huawei et al., "Resource Allocation and Indication for Data Channel," 3GPP TSG RAN WG1 Meeting #88bis, R1-1705069, Spokane, USA, Apr. 3-7, 2017, 8 Pages.

* cited by examiner

CSI-RS CONFIGURATION FOR PARTIAL BAND RETUNING

CROSS REFERENCE TO RELATED APPLICATIONS

The present Application is a 371 national phase filing of International Patent Application No. PCT/CN2018/083863 by ZHANG et. al., titled "CSI-RS CONFIGURATION FOR PARTIAL BAND RETUNING", filed Apr. 20, 2018; and to International Patent Application No. PCT/CN2017/084710 by ZHANG et. al., titled "CSI-RS CONFIGURATION FOR PARTIAL BAND RETUNING", filed May 17, 2017, each of which is assigned to the assignee hereof, which is hereby incorporated by reference in their entirety.

BACKGROUND

The following relates generally to wireless communication, and more specifically to CSI-RS configuration for partial band retuning.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system). A wireless multiple-access communications system may include a number of base stations or access network nodes, each simultaneously supporting communication for multiple communication devices, which may be otherwise known as user equipment (UE).

A UE operating in a wireless communications systems may support a system bandwidth. In some cases, the UE may be configured to communicate over the entire system bandwidth (e.g., 20 MHz, 100 MHz, etc.). Alternatively, a UE may be configured to communicate via a narrow band or partial band (e.g., a 5 MHz partial band, a 10 MHz, partial band, a 20 MHz partial band, etc.) within the system bandwidth. In some cases, a UE may be dynamically configured by a base station to switch or retune to a different partial band.

Channel state information reference signals (CSI-RS) may be transmitted by a base station according to a pattern of resources. A UE may measure CSI-RS transmissions to obtain channel state information which can be relayed back to the base station. CSI-RS transmission patterns are traditionally configured at the radio resource control (RRC) layer (e.g., during the establishment or reconfiguration of a connection between the base station and the UE). Current wireless communications systems are inadequate with respect to the partial bands for CSI-RS transmissions.

SUMMARY

The described techniques relate to improved methods, systems, devices, or apparatuses that support channel state information reference signal (CSI-RS) configuration for partial band retuning. A user equipment (UE) may receive a message indicating, for each or multiple partial bands, a set of possible CSI-RS configurations. The UE may further receive downlink control information (DCI) from a base station, which may indicate a set of downlink resources associated with a first partial band. The UE may select a first CSI-RS configuration from the set of possible CSI-RS configurations for the first partial band based on the DCI, and when the base station transmits CSI-RS, the UE may obtain CSI-RS measurements over the first partial band during the set of downlink resources using the selected first CSI-RS configuration.

A method of wireless communication is described. The method may include receiving from a base station a message indicating, for each partial band of a plurality of partial bands within a total configured bandwidth of the UE, a set of possible CSI-RS configurations, receiving DCI from the base station, the DCI indicating a set of downlink resources associated with a first partial band of the plurality of partial bands, selecting a first CSI-RS configuration from the set of possible CSI-RS configurations for the first partial band based at least in part on the DCI, and obtaining CSI-RS measurements over the first partial band during the set of downlink resources using the selected first CSI-RS configuration.

An apparatus for wireless communication is described. The apparatus may include means for receiving from a base station a message indicating, for each partial band of a plurality of partial bands within a total configured bandwidth of the UE, a set of possible CSI-RS configurations, means for receiving DCI from the base station, the DCI indicating a set of downlink resources associated with a first partial band of the plurality of partial bands, means for selecting a first CSI-RS configuration from the set of possible CSI-RS configurations for the first partial band based at least in part on the DCI, and means for obtaining CSI-RS measurements over the first partial band during the set of downlink resources using the selected first CSI-RS configuration.

Another apparatus for wireless communication is described. The apparatus may include a processor, memory in electronic communication with the processor, and instructions stored in the memory. The instructions may be operable to cause the processor to receive from a base station a message indicating, for each partial band of a plurality of partial bands within a total configured bandwidth of the UE, a set of possible CSI-RS configurations, receive DCI from the base station, the DCI indicating a set of downlink resources associated with a first partial band of the plurality of partial bands, select a first CSI-RS configuration from the set of possible CSI-RS configurations for the first partial band based at least in part on the DCI, and obtain CSI-RS measurements over the first partial band during the set of downlink resources using the selected first CSI-RS configuration.

A non-transitory computer readable medium for wireless communication is described. The non-transitory computer-readable medium may include instructions operable to cause a processor to receive from a base station a message indicating, for each partial band of a plurality of partial bands within a total configured bandwidth of the UE, a set of possible CSI-RS configurations, receive DCI from the base station, the DCI indicating a set of downlink resources associated with a first partial band of the plurality of partial bands, select a first CSI-RS configuration from the set of possible CSI-RS configurations for the first partial band based at least in part on the DCI, and obtain CSI-RS measurements over the first partial band during the set of downlink resources using the selected first CSI-RS configuration.

Some examples of the method, apparatus, and non-transitory computer-readable medium described above may further include processes, features, means, or instructions for retuning a receiver of the UE to the first partial band from a second partial band based at least in part on the received DCI.

Some examples of the method, apparatus, and non-transitory computer-readable medium described above may further include processes, features, means, or instructions for selecting a CSI-RS configuration from the set of possible CSI-RS configurations for the first partial band based at least in part on periodic CSI-RS information in the received message. In some examples of the method, apparatus, and non-transitory computer-readable medium described above, the received message may be a radio resource control (RRC) message.

Some examples of the method, apparatus, and non-transitory computer-readable medium described above may further include processes, features, means, or instructions for selecting a CSI-RS configuration from the set of possible CSI-RS configurations for the first partial band based at least in part on semi-persistent CSI-RS information in the received message.

In some examples of the method, apparatus, and non-transitory computer-readable medium described above, the received message may be a media access control (MAC) layer message. In some examples of the method, apparatus, and non-transitory computer-readable medium described above, selecting the CSI-RS configuration comprises: receiving an indication of the first CSI-RS configuration in the DCI.

Some examples of the method, apparatus, and non-transitory computer-readable medium described above may further include processes, features, means, or instructions for transmitting a channel state information (CSI) report to the base station based at least in part on the CSI-RS measurements over the first partial band.

In some examples of the method, apparatus, and non-transitory computer-readable medium described above, at least one CSI-RS configuration of the set of possible CSI-RS configurations corresponds to a zero power (ZP) CSI-RS, and at least one CSI-RS configuration of the set of possible CSI-RS configurations corresponds to a non-zero power (NZP) CSI-RS.

In some examples of the method, apparatus, and non-transitory computer-readable medium described above, the set of possible CSI-RS configurations comprises at least two subsets of possible CSI-RS configurations corresponding to different CSI-RS time-domain characteristics.

In some examples of the method, apparatus, and non-transitory computer-readable medium described above, at least one of the subsets of possible CSI-RS configurations corresponds to periodic CSI-RS configurations. In some examples of the method, apparatus, and non-transitory computer-readable medium described above, at least one of the subsets of possible CSI-RS configurations corresponds to aperiodic CSI-RS configurations. In some examples of the method, apparatus, and non-transitory computer-readable medium described above, at least one of the subsets of possible CSI-RS configurations corresponds to semi-persistent CSI-RS configurations.

A method of wireless communication is described. The method may include transmitting a message to a UE indicating, for each partial band of a plurality of partial bands within a total configured bandwidth of the UE, a set of possible CSI-RS configurations, transmitting DCI to the UE, the DCI indicating a set of downlink resources associated with a first partial band of the plurality of partial bands, selecting a CSI-RS configuration from the set of possible CSI-RS configurations for the first partial band based at least in part on the set of downlink resources, and performing CSI-RS transmissions during the set of downlink resources according to the determined CSI-RS configuration.

An apparatus for wireless communication is described. The apparatus may include means for transmitting a message to a UE indicating, for each partial band of a plurality of partial bands within a total configured bandwidth of the UE, a set of possible CSI-RS configurations, means for transmitting DCI to the UE, the DCI indicating a set of downlink resources associated with a first partial band of the plurality of partial bands, means for selecting a CSI-RS configuration from the set of possible CSI-RS configurations for the first partial band based at least in part on the set of downlink resources, and means for performing CSI-RS transmissions during the set of downlink resources according to the determined CSI-RS configuration.

Another apparatus for wireless communication is described. The apparatus may include a processor, memory in electronic communication with the processor, and instructions stored in the memory. The instructions may be operable to cause the processor to transmit a message to a UE indicating, for each partial band of a plurality of partial bands within a total configured bandwidth of the UE, a set of possible CSI-RS configurations, transmit DCI to the UE, the DCI indicating a set of downlink resources associated with a first partial band of the plurality of partial bands, select a CSI-RS configuration from the set of possible CSI-RS configurations for the first partial band based at least in part on the set of downlink resources, and perform CSI-RS transmissions during the set of downlink resources according to the determined CSI-RS configuration.

A non-transitory computer readable medium for wireless communication is described. The non-transitory computer-readable medium may include instructions operable to cause a processor to transmit a message to a UE indicating, for each partial band of a plurality of partial bands within a total configured bandwidth of the UE, a set of possible CSI-RS configurations, transmit DCI to the UE, the DCI indicating a set of downlink resources associated with a first partial band of the plurality of partial bands, select a CSI-RS configuration from the set of possible CSI-RS configurations for the first partial band based at least in part on the set of downlink resources, and perform CSI-RS transmissions during the set of downlink resources according to the determined CSI-RS configuration.

Some examples of the method, apparatus, and non-transitory computer-readable medium described above may further include processes, features, means, or instructions for transmitting instructions to retune a receiver of the UE to the first partial band from a second partial band based via the DCI.

Some examples of the method, apparatus, and non-transitory computer-readable medium described above may further include processes, features, means, or instructions for selecting a CSI-RS configuration from the set of possible CSI-RS configurations for the first partial band based at least in part on periodic CSI-RS information in the transmitted message.

In some examples of the method, apparatus, and non-transitory computer-readable medium described above, the transmitted message may be a RRC message. Some examples of the method, apparatus, and non-transitory computer-readable medium described above may further include processes, features, means, or instructions for selecting a CSI-RS configuration from the set of possible CSI-RS configurations for the first partial band based at least in part on semi-persistent CSI-RS information in the transmitted message.

In some examples of the method, apparatus, and non-transitory computer-readable medium described above, the transmitted message may be a MAC layer message. In some examples of the method, apparatus, and non-transitory computer-readable medium described above, selecting the CSI-RS configuration comprises: transmitting an indication of the first CSI-RS configuration in the DCI.

Some examples of the method, apparatus, and non-transitory computer-readable medium described above may further include processes, features, means, or instructions for receiving a CSI report from the UE based at least in part on the performed CSI-RS transmission according to the determined CSI-RS configuration.

In some examples of the method, apparatus, and non-transitory computer-readable medium described above, at least one CSI-RS configuration of the set of possible CSI-RS configurations corresponds to a ZP CSI-RS, and at least one CSI-RS configuration of the set of possible CSI-RS configurations corresponds to a NZP CSI-RS.

In some examples of the method, apparatus, and non-transitory computer-readable medium described above, the set of possible CSI-RS configurations comprises at least two subsets of possible CSI-RS configurations corresponding to different CSI-RS time-domain characteristics. In some examples of the method, apparatus, and non-transitory computer-readable medium described above, at least one of the subsets of possible CSI-RS configurations corresponds to periodic CSI-RS configurations.

In some examples of the method, apparatus, and non-transitory computer-readable medium described above, at least one of the subsets of possible CSI-RS configurations corresponds to aperiodic CSI-RS configurations. In some examples of the method, apparatus, and non-transitory computer-readable medium described above, at least one of the subsets of possible CSI-RS configurations corresponds to semi-persistent CSI-RS configurations.

A method of wireless communication is described. The method may include receiving from a base station a CSI-RS configuration associated with a first partial band within a total configured bandwidth of the UE, receiving DCI from the base station, the DCI indicating a set of downlink resources associated with a second partial band within the total configured bandwidth of the UE, and transmitting one of an error message or a partial CSI report to the base station based at least in part on a degree of overlap between the first partial band and the second partial band.

An apparatus for wireless communication is described. The apparatus may include means for receiving from a base station a CSI-RS configuration associated with a first partial band within a total configured bandwidth of the UE, means for receiving DCI from the base station, the DCI indicating a set of downlink resources associated with a second partial band within the total configured bandwidth of the UE, and means for transmitting one of an error message or a partial CSI report to the base station based at least in part on a degree of overlap between the first partial band and the second partial band.

Another apparatus for wireless communication is described. The apparatus may include a processor, memory in electronic communication with the processor, and instructions stored in the memory. The instructions may be operable to cause the processor to receive from a base station a CSI-RS configuration associated with a first partial band within a total configured bandwidth of the UE, receive DCI from the base station, the DCI indicating a set of downlink resources associated with a second partial band within the total configured bandwidth of the UE, and transmit one of an error message or a partial CSI report to the base station based at least in part on a degree of overlap between the first partial band and the second partial band.

A non-transitory computer readable medium for wireless communication is described. The non-transitory computer-readable medium may include instructions operable to cause a processor to receive from a base station a CSI-RS configuration associated with a first partial band within a total configured bandwidth of the UE, receive DCI from the base station, the DCI indicating a set of downlink resources associated with a second partial band within the total configured bandwidth of the UE, and transmit one of an error message or a partial CSI report to the base station based at least in part on a degree of overlap between the first partial band and the second partial band.

Some examples of the method, apparatus, and non-transitory computer-readable medium described above may further include processes, features, means, or instructions for determining that the first partial band and the second partial band do not overlap. Some examples of the method, apparatus, and non-transitory computer-readable medium described above may further include processes, features, means, or instructions for transmitting the error message based at least in part on the determining.

Some examples of the method, apparatus, and non-transitory computer-readable medium described above may further include processes, features, means, or instructions for determining a portion of the first partial band that overlaps with the second partial band. Some examples of the method, apparatus, and non-transitory computer-readable medium described above may further include processes, features, means, or instructions for obtaining CSI-RS measurements over the portion of the first partial band that overlaps with the second partial band.

DETAILED DESCRIPTION

Figure 1:
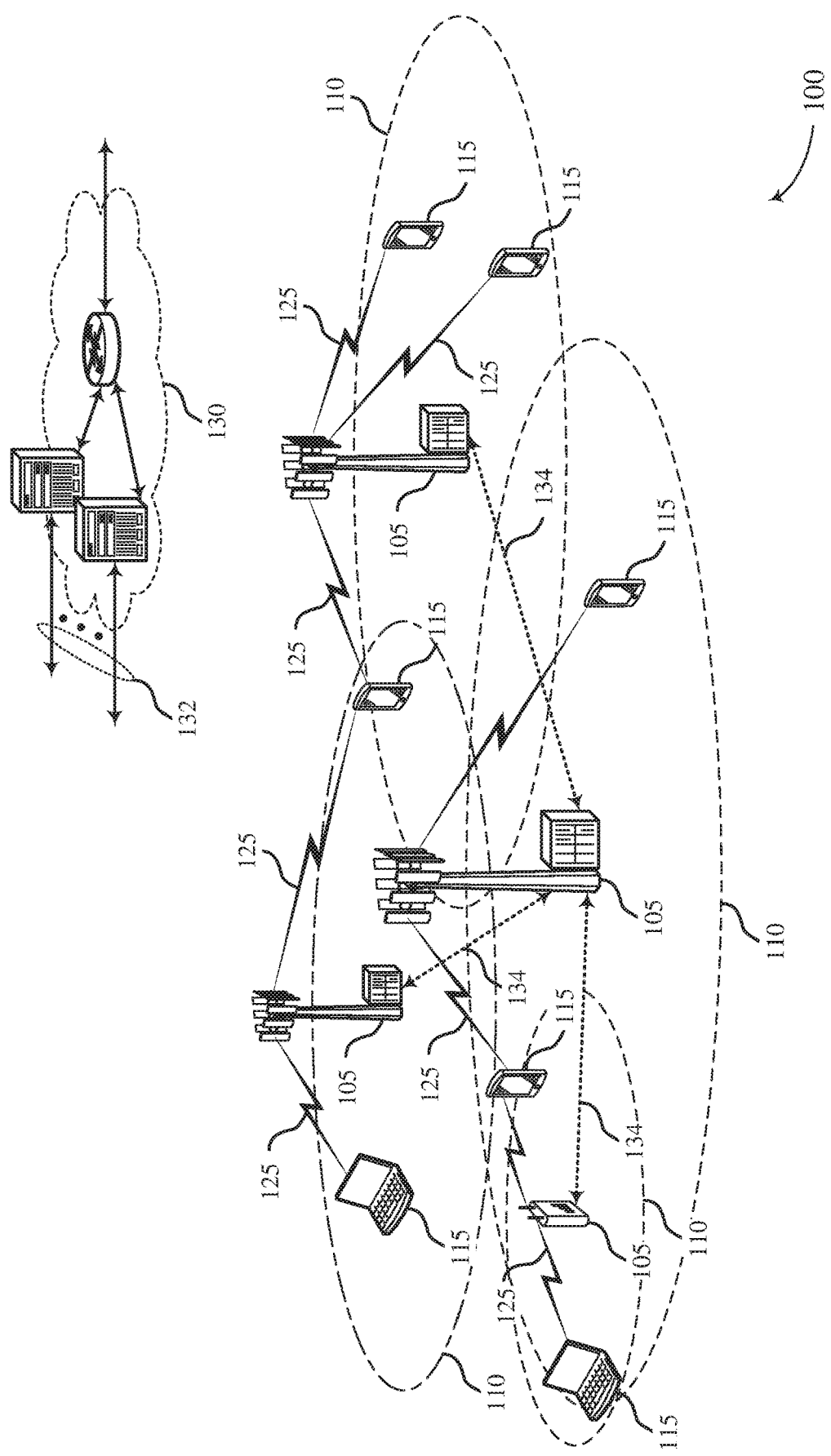
FIG. 1 illustrates an example of a system for wireless communication that supports channel state information reference signal (CSI-RS) configuration for partial band retuning in accordance with aspects of the present disclosure.

A user equipment (UE) operating in a wireless communications systems may have a system bandwidth. In some cases, the UE may be configured to communicate over the entire system bandwidth (e.g., 20 MHz, 100 MHz, etc.). Alternatively, a UE may be configured to communicate via a narrow band or partial band (e.g., a 5 MHz partial band, a 10 MHz, partial band, a 20 MHz partial band, etc.) within the system bandwidth. In some cases, a UE may be dynamically configured by a base station to switch or retune to a different partial band.

Channel state information reference signals (CSI-RS) may be transmitted by a base station according to a pattern of resources. A UE may measure CSI-RS transmissions to obtain channel state information which can be relayed back to the network. CSI-RS transmission patterns are traditionally configured at the radio resource control (RRC) layer (e.g., during the establishment or reconfiguration of a connection between the base station and the UE). Because these RRC communications occur much less frequently than resource grants to the UE, CSI-RS configurations may not be reconfigured as frequently as the location or bandwidth of resources granted to the UE change. In such cases, a UE may retune to a different partial band based on a grant in downlink control information (DCI) received from a base station, without receiving a new CSI-RS configuration in an RRC message. This situation may result in CSI-RS transmissions occurring outside of the partial band to which the UE has retuned, making it difficult or impossible for the UE to obtain accurate CSI-RS measurements. In such scenarios, it may be beneficial for UE configuration, or CSI-RS configuration to address partial band transitions.

In one set of examples, a UE and a base station may set up or reconfigure a connection using RRC messaging. As part of this process, the UE may receive an RRC message that indicates a set of possible CSI-RS configurations for each partial band within the total configured bandwidth for the UE. Each possible CSI-RS configuration may include resource elements on which the UE may take CSI-RS measurements. The CSI-RS configurations may include one CSI-RS configuration per partial band, or multiple CSI-RS configurations per partial band. Furthermore, the set of possible CSI-RS configurations may include subsets of CSI-RS configurations. The possible CSI-RS configurations may correspond to particular types of CSI-RS (e.g., periodic, aperiodic, or semi-persistent CSI-RS information). Additionally or alternatively, the possible CSI-RS configurations may be based on a frequency location within the total bandwidth, or a partial band within the total bandwidth. The UE may further receive a downlink grant, which may include DCI, from the base station. The DCI may indicate partial band retuning from a first partial band to a second partial band. In some cases, the DCI may also include an indication of which of the possible CSI-RS configurations the UE should utilize in taking CSI-RS measurements.

In another set of examples, a UE may retune from a first partial band to a second partial band based on a downlink grant received from a base station. If the first partial band and the second partial band do not overlap, the UE may transmit an error message to the base station indicating a failure or inability to measure a CSI-RS. If a portion of the first partial band overlaps with a portion of the second partial band, the UE may determine the overlapping portions of the first partial band and the second partial band and take partial CSI-RS measurements over the overlapping portion. The UE may transmit the partial CSI-RS measurements to the base station. Aspects of the disclosure are initially described in the context of a wireless communications system. Aspects of the disclosure are further described in the context of partial band retuning scenario s, and CSI-RS configuration settings. Aspects of the disclosure are further illustrated by and described with reference to apparatus diagrams, system diagrams, and flowcharts that relate to CSI-RS configuration for partial band retuning.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE), LTE-Advanced (LTE-A) network, or a New Radio (NR) network. In some cases, wireless communications system 100 may support enhanced broadband communications, ultra-reliable (i.e., mission critical) communications, low latency communications, and communications with low-cost and low-complexity devices. In some examples a base station 105 may transmit a message including a set of possible CSI-RS configurations, and may also transmit DCI. A UE 115 may determine a CSI-RS configuration to utilize based on the message, or the DCI, or both.

Base stations 105 may wirelessly communicate with UEs 115 via one or more base station antennas. Each base station 105 may provide communication coverage for a respective geographic coverage area 110. Communication links 125 shown in wireless communications system 100 may include uplink transmissions from a UE 115 to a base station 105, or downlink transmissions, from a base station 105 to a UE 115. Control information and data may be multiplexed on an uplink channel or downlink according to various techniques.

Control information and data may be multiplexed on a downlink channel, for example, using time division multiplexing (TDM) techniques, frequency division multiplexing (FDM) techniques, or hybrid TDM-FDM techniques. In some examples, the control information transmitted during a transmission time interval (TTI) of a downlink channel may be distributed between different control regions in a cascaded manner (e.g., between a common control region and one or more UE-specific control regions).

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of Things (IoT) device, an Internet of Everything (IoE) device, a machine type communication (MTC) device, an appliance, an automobile, or the like.

In some cases, a UE 115 may also be able to communicate directly with other UEs (e.g., using a peer-to-peer (P2P) or device-to-device (D2D) protocol). One or more of a group of UEs 115 utilizing D2D communications may be within the geographic coverage area 110 of a cell. Other UEs 115 in such a group may be outside the geographic coverage area 110 of a cell, or otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out independent of a base station 105.

Some UEs 115, such as MTC or IoT devices, may be low cost or low complexity devices, and may provide for automated communication between machines, i.e., Machine-to-Machine (M2M) communication. M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In some cases, an MTC device may operate using half-duplex (one-way) communications at a reduced peak rate. MTC devices may also be configured to enter a power saving "deep sleep" mode when not engaging in active communications. In some cases, MTC or IoT devices may be designed to support mission critical functions and wireless communications system may be configured to provide ultra-reliable communications for these functions.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as evolved NodeBs (eNBs) 105 or gNodeBs (gNBs).

A base station 105 may be connected by an S1 interface to the core network 130. The core network may be an evolved packet core (EPC), which may include at least one mobility management entity (MME), at least one serving gateway (S-GW), and at least one Packet Data Network (PDN) gateway (P-GW). The MME may be the control node that processes the signaling between the UE 115 and the EPC. All user Internet Protocol (IP) packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS) Streaming Service.

The core network 130 may provide user authentication, access authorization, tracking, Internet Protocol (IP) connectivity, and other access, routing, or mobility functions. At least some of the network devices, such as the base stations 105, may include subcomponents such as an access network entity, which may be an example of an access node controller (ANC). Each access network entity may communicate with a number of UEs 115 through a number of other access network transmission entities, each of which may be an example of a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate in an ultra-high frequency (UHF) frequency region using frequency bands from 700 MHz to 2600 MHz (2.6 GHz), although some networks (e.g., a wireless local area network (WLAN)) may use frequencies as high as 4 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some cases, wireless communications system 100 may also utilize extremely high frequency (EHF) portions of the spectrum (e.g., from 30 GHz to 300 GHz). This region may also be known as the millimeter band, since the wavelengths range from approximately one millimeter to one centimeter in length. Thus, EHF antennas may be even smaller and more closely spaced than UHF antennas. In some cases, this may facilitate use of antenna arrays within a UE 115 (e.g., for directional beamforming). However, EHF transmissions may be subject to even greater atmospheric attenuation and shorter range than UHF transmissions.

Thus, wireless communications system 100 may support millimeter wave (mmW) communications between UEs 115 and base stations 105. Devices operating in mmW or EHF bands may have multiple antennas to allow beamforming. That is, a base station 105 may use multiple antennas or antenna arrays to conduct beamforming operations for directional communications with a UE 115. Beamforming (which may also be referred to as spatial filtering or directional transmission) is a signal processing technique that may be used at a transmitter (e.g., a base station 105) to shape and/or steer an overall antenna beam in the direction of a target receiver (e.g., a UE 115). This may be achieved by combining elements in an antenna array in such a way that transmitted signals at particular angles experience constructive interference while others experience destructive interference.

Multiple-input multiple-output (MIMO) wireless systems use a transmission scheme between a transmitter (e.g., a base station 105) and a receiver (e.g., a UE 115), where both transmitter and receiver are equipped with multiple antennas. Some portions of wireless communications system 100 may use beamforming. For example, base station 105 may have an antenna array with a number of rows and columns of antenna ports that the base station 105 may use for beamforming in its communication with UE 115. Signals may be transmitted multiple times in different directions (e.g., each transmission may be beamformed differently). A mmW receiver (e.g., a UE 115) may try multiple beams (e.g., antenna subarrays) while receiving the synchronization signals.

In some cases, the antennas of a base station 105 or UE 115 may be located within one or more antenna arrays, which may support beamforming or MIMO operation. One or more base station antennas or antenna arrays may be collocated at an antenna assembly, such as an antenna tower. In some cases, antennas or antenna arrays associated with a base station 105 may be located in diverse geographic locations. A base station 105 may multiple use antennas or antenna arrays to conduct beamforming operations for directional communications with a UE 115.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use Hybrid ARQ (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

Time intervals in LTE or NR may be expressed in multiples of a basic time unit (which may be a sampling period of $T_s=1/30,720,000$ seconds). Time resources may be organized according to radio frames of length of 10 ms ($T_f=307200T_s$), which may be identified by a system frame number (SFN) ranging from 0 to 1023. Each frame may include ten 1 ms subframes numbered from 0 to 9. A subframe may be further divided into two 0.5 ms slots, each of which contains 6 or 7 modulation symbol periods (depending on the length of the cyclic prefix prepended to each symbol). Excluding the cyclic prefix, each symbol contains 2048 sample periods. In some cases the subframe may be the smallest scheduling unit, also known as a TTI. In other cases, a TTI may be shorter than a subframe or may be dynamically selected (e.g., in short TTI bursts or in selected component carriers using short TTIs).

A resource element may consist of one symbol period and one subcarrier (e.g., a 15 KHz frequency range). A resource block may contain 12 consecutive subcarriers in the frequency domain and, for a normal cyclic prefix in each orthogonal frequency division multiplexing (OFDM) symbol, 7 consecutive OFDM symbols in the time domain (1 slot), or 84 resource elements. The number of bits carried by each resource element may depend on the modulation scheme (the configuration of symbols that may be selected during each symbol period). Thus, the more resource blocks that a UE receives and the higher the modulation scheme, the higher the data rate may be.

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both frequency division duplexing (FDD) and time division duplexing (TDD) component carriers.

In some cases, wireless communications system 100 may utilize enhanced component carriers (eCCs). An eCC may be characterized by one or more features including: wider bandwidth, shorter symbol duration, shorter TTIs, and modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (where more than one operator is allowed to use the spectrum). An eCC characterized by wide bandwidth may include one or more segments that may be utilized by UEs 115 that are not capable of monitoring the whole bandwidth or prefer to use a limited bandwidth (e.g., to conserve power).

In some cases, an eCC may utilize a different symbol duration than other CCs, which may include use of a reduced symbol duration as compared with symbol durations of the other CCs. A shorter symbol duration is associated with increased subcarrier spacing. A device, such as a UE 115 or base station 105, utilizing eCCs may transmit wideband signals (e.g., 20, 40, 60, 80 MHz, etc.) at reduced symbol durations (e.g., 16.67 microseconds). A TTI in eCC may consist of one or multiple symbols. In some cases, the TTI duration (that is, the number of symbols in a TTI) may be variable.

A shared radio frequency spectrum band may be utilized in an NR shared spectrum system. For example, an NR shared spectrum may utilize any combination of licensed, shared, and unlicensed spectrums, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

In some cases, wireless communications system 100 may utilize both licensed and unlicensed radio frequency spectrum bands. For example, wireless communications system 100 may employ LTE License Assisted Access (LTE-LAA) or LTE Unlicensed (LTE U) radio access technology or NR technology in an unlicensed band such as the 5 Ghz Industrial, Scientific, and Medical (ISM) band. When operating in unlicensed radio frequency spectrum bands, wireless devices such as base stations 105 and UEs 115 may employ listen-before-talk (LBT) procedures to ensure the channel is clear before transmitting data. In some cases, operations in unlicensed bands may be based on a CA configuration in conjunction with CCs operating in a licensed band. Operations in unlicensed spectrum may include downlink transmissions, uplink transmissions, or both. Duplexing in unlicensed spectrum may be based on FDD, TDD or a combination of both.

In some cases, base station 105 may establish communication with UE 115. Base station 105 may configure a CSI-RS transmission pattern. UE 115 may be configured to operate on more than one partial bands within a total bandwidth. In some examples, base station 105 may transmit a grant of resources to UE 115, which may indicate that UE 115 is to retune from a first partial band to a second partial band. However, CSI-RS configurations may not be updated as often as retuning occurs. In order to address this scenario, a UE 115 may be configured to make partial CSI-RS measurements, or transmit an error message when CSI-RS resources are not available on a partial band. Additionally or alternatively, base station 105 may include a set of possible CSI-RS configurations in an RRC message. A base station may receive a grant of resources, which may include DCI, and utilize the RRC message or the DCI, or both, to select one of the set of possible CSI-RS configurations. UE 115 may thereby take accurate and complete CSI-RS measurements, and transmit a CSI-RS report based thereon.

Figure 2:
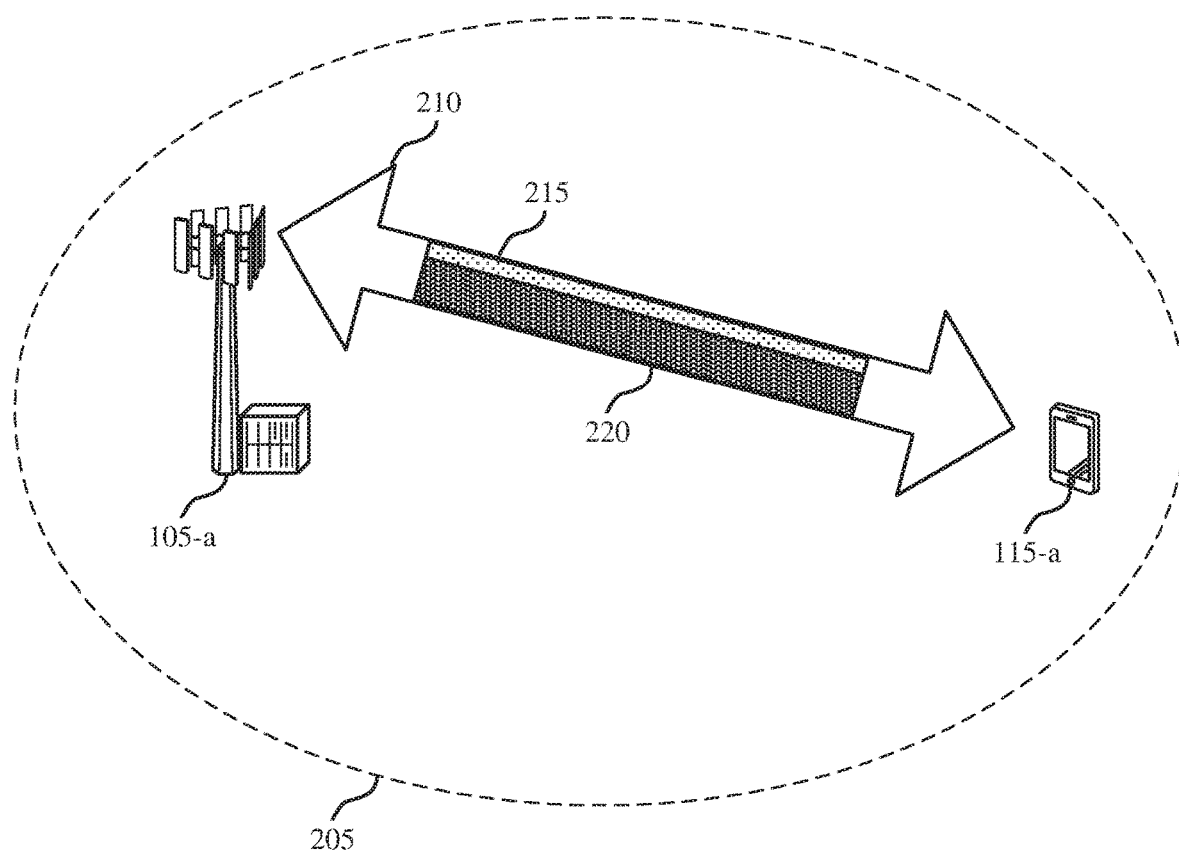
FIG. 2 illustrates an example of a wireless communications system that supports CSI-RS configuration for partial band retuning in accordance with aspects of the present disclosure.

FIG. 2 illustrates an example of a wireless communications system 200 that supports CSI-RS configuration for partial band retuning in accordance with various aspects of the present disclosure. In some examples, Wireless communications system 200 may implement aspects of wireless communications system 100. Wireless communications system 200 may include a base station 105-a and a UE 115-a, which may be examples of the corresponding devices described with reference to FIG. 1. Base station 105-a may communicate with one or more UEs 115-a within geographic coverage area 205, via one or more bidirectional communication links 210. UE 115-a may have a system bandwidth, and may be configured to communicate over the entire bandwidth (e.g., 20 MHz, 100 MHz, etc.). Alternatively, UE 115-a may be configured to communicate via a narrow band or partial band (e.g., a 5 MHz partial band, a 10 MHz, partial band, a 20 MHz partial band, etc.) within the system bandwidth. For instance, UE 115-a may be configured to communicate via a first partial band 215.

Base station 105-a may transmit CSI-RSs according to a pattern of resources. UE 115-a may measure CSI-RS transmissions to obtain channel state information which can be relayed back to the network. CSI-RS patterns are traditionally configured to the radio resource control (RRC) layer (e.g., during establishment or reconfiguration of bidirectional communication link 210). However, RRC communications may occur with much less frequency than resource grants to UE 115-a. Thus, CSI-RS configurations may not be reconfigured as frequently as the location or bandwidth of resources granted to the UE. For example, UE 115-a may be configured to communicate with base station 105-a via first partial band 215. Upon reception of a grant of resources, UE 115-a may retune from first partial band 215 to second partial band 220. Second partial band 220 may have the same bandwidth as first partial band 215, but may be located at a different frequency range in the frequency domain. Alternatively, second partial band 220 may have a different bandwidth than first partial band 215. For example, first partial band 215 may be a 5 MHz partial band, and second partial band 220 may be a 10 MHz partial band.

In some examples, UE 115-a may receive a grant of resources and retune from first partial band 215 to second partial band 220, but may not receive a new CSI-RS reconfiguration from base station 105-a. Thus, base station 105-a may transmit CSI-RS transmissions outside of second partial band 220 (e.g., in first partial band 215). In such cases, UE 115-a may be unable to obtain accurate CSI-RS measurements.

In one set of examples, at the RRC layer, base station 105-a may transmit an RRC message that indicates a set of possible CSI-RS configurations for each partial band within the total configured bandwidth for UE 115-a. Each possible CSI-RS configuration may identify the resource elements on which UE 115-a may obtain CSI-RS measurements. The set of possible CSI-RS configurations may include one CSI-RS configuration per partial band, such that UE 115-a can determine which CSI-RS configuration to utilize based on the partial band to which UE 115-a retunes. In other examples, the set of possible CSI-RS configurations may include multiple CSI-RS configurations per partial band. For example, the set of possible CSI-RS configurations may include some number (4, 8, 12, etc.) of CSI-RS configurations for each of a plurality of partial bands. Thus, partial bands 215 and 220 may each correspond to 4 different CSI-RS configurations. UE 115-a may receive DCI indicating that it retune from partial band 215 to partial band 220. The DCI may further include an indication of which of the four CSI-RS configurations corresponding to partial band 215 UE 115-a should utilize in taking CSI-RS measurements. For example, the DCI may include a two-bit indicator, which indicates which of the four possible CSI-RS configurations to use. In some examples, zero power (ZP) CSI-RS and non-zero power (NZP) CSI-RS may have different CSI-RS configurations for each partial band.

Furthermore, the set of possible CSI-RS configurations may be divided into subsets of CSI-RS configurations. The subsets of possible CSI-RS configurations may correspond to particular time-domain characteristics of CSI-RS transmissions (e.g., periodic, aperiodic, or semi-persistent CSI-RS transmissions). For example, for each partial band, the set of possible CSI-RS configurations may include a subset of possible CSI-RS configurations (e.g., two configurations) for periodic CSI-RS, a subset of possible CSI-RS configurations (e.g. two configurations) for aperiodic CSI-RS, and a subset of possible CSI-RS configurations (e.g., three configurations) for semi-persistent CSI-RS configurations. Periodic and semi-persistent CSI-RS configurations may be configured at the RRC level, such that UE 115-a may determine which CSI-RS configuration to utilize based on the RRC messaging. Aperiodic CSI-RS configurations may be indicated I the DCI.

Additionally or alternatively, the possible CSI-RS configurations may be based on a frequency location within the total bandwidth, or a partial band within the total bandwidth. UE 115-a may further receive a downlink grant, which may include DCI, from base station 105-*a*. The DCI may indicate partial band retuning from first partial band 215 to second partial band 220. In some cases, the DCI may also include an indication of which of the possible CSI-RS configurations UE 115-*a* should utilize in taking CSI-RS measurements.

Figure 3:
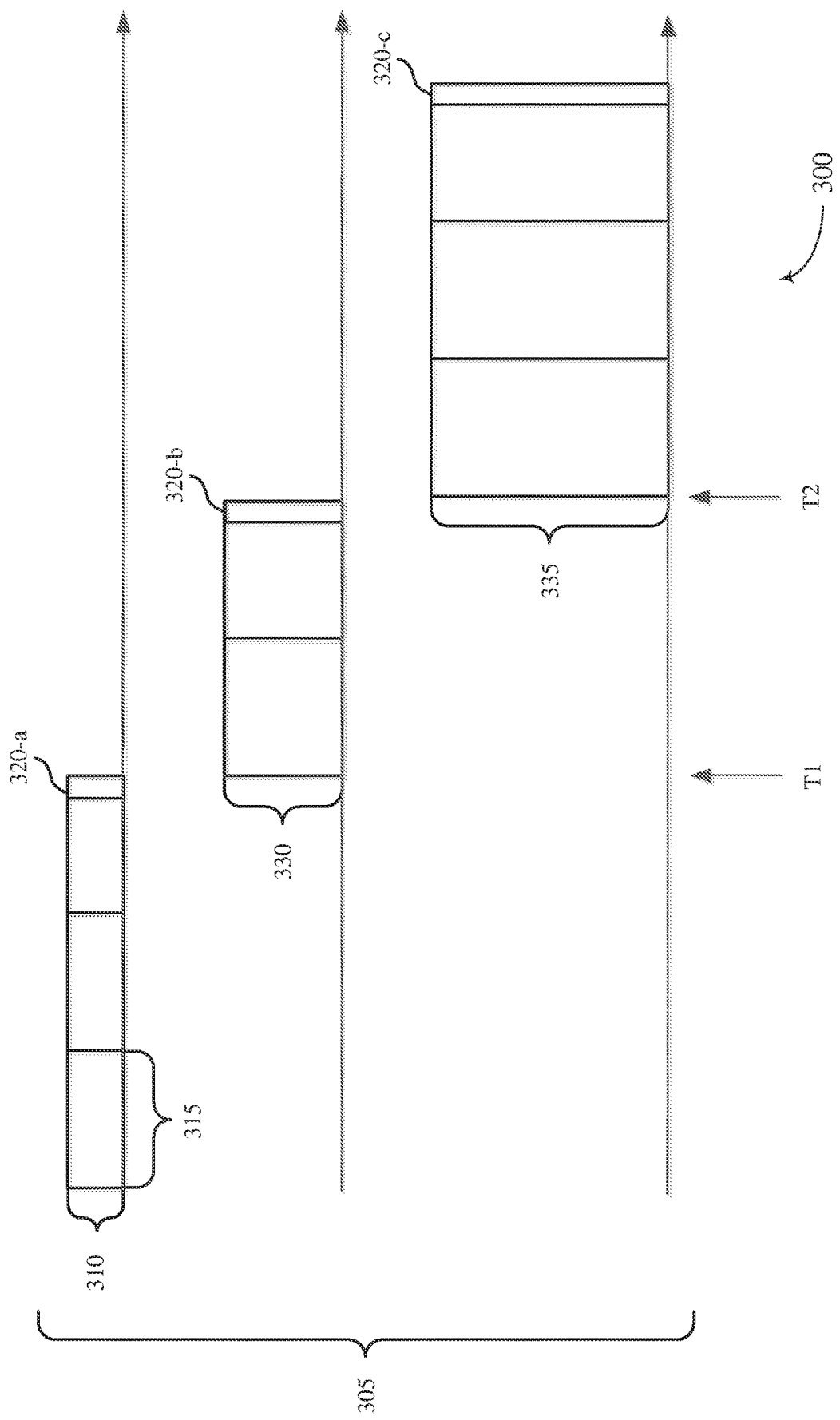
FIG. 3 illustrates an example of a partial band retuning scenario that supports CSI-RS configuration for partial band retuning in accordance with aspects of the present disclosure.

Additionally or alternatively, UE 115-*a* may retune from first partial band 215 to second partial band 220 based on a downlink grant received from base station 105-*a*. If first partial band 215 and second partial band 220 do not overlap, then UE 115-*a* may transmit an error message to base station 105-*a* indicating a failure or inability of UE 115-*a* to measure a CSI-RS. If a portion of first partial band 215 overlaps with a portion of second partial band 220, then UE 115-*a* may determine the overlapping portions of first partial band 215 and second partial band 2220 and take partial CSI-RS measurements over the overlapping portion. In such cases, UE 115-*a* may transmit the partial CSI-RS measurements to base station 105-*a*. FIG. 3 illustrates an example of a partial band retuning scenario 300 that supports CSI-RS configuration for partial band retuning in accordance with various aspects of the present disclosure. In some examples, partial band retuning scenario 300 may implement aspects of wireless communications system 100 of FIG. 1 or wireless communications system 200 of FIG. 2. Partial band retuning scenario 300 may represent aspects of techniques performed by a UE 115 or base station 105 as described with reference to FIGS. 1-2. In some cases, a UE 115 may be configured with a total system bandwidth 305 (e.g., 20 MHz, 100 MHz, etc.). In some examples, UE 115 may be configured to communicate via a narrow band or partial band (e.g. a 5 MHz partial band, a 10 MHz, partial band, a 20 MHz partial band, etc.) within the total system bandwidth 305. In some examples, a base station 105 may dynamically configure a UE 115 to operate on different partial bands within the total system bandwidth 305.

For example, a UE 115 may establish or reconfigure a connection with a base station 105 at the RRC layer. The UE 115 may receive resources to communicate with the base station 105 via a partial band 310. Partial band 310 may be, for example, a 5 MHz partial band. The UE 115 may communicate with the base station 105 via partial band 315 for some duration determined by a grant from the base station 105. For example, UE 115 may communicate via partial band 310 for three transmission time intervals (TTIs) (e.g., slots, mini-slots, etc.). The grant of resources may include a gap period 320-*a* for retuning. That is, prior to a first time T1 base station 105 may grant resources to UE 115 within a different partial band. During gap period 320-*a*, UE 115 may retune to partial band 330. Partial band 330 may be, for example, a 10 MHz partial band. UE 115 may communicate with base station 105 via partial band 330 for an indicated duration (e.g., 2 TTIs). Base station 105 may provide an additional grant of resources within a different partial band. During gap period 320-*b*, UE 115 may retune from partial band 330 to partial band 335. At T2, UE 115 may utilize resources within partial band 335 to communicate with base station 105.

However, CSI-RS transmission patterns may be configured at the RRC layer, and RRC communications may occur less frequently than the resource grants that trigger a transition for UE 115 from one partial band to another at T1 and T2. UE 115 may receive an RRC message including a CSI-RS configuration. However, the received CSI-RS configuration may not configure CSI-RS transmissions for partial band 330 and partial band 335. In such cases, UE 115 may be unable to obtain accurate CSI-RS configurations corresponding to partial band 330 and partial band 335. To address this scenario, UE 115 may be configured to send an error message or make a partial measurement upon determining that a CSI-RS configuration does not correspond to a current partial band. Additionally or alternatively, base station 105 may transmit a message to UE 115 including a set of possible CSI-RS configurations during establishment or reconfiguration of a connection. When UE 115 transitions from a first partial band (e.g. partial band 310) to a second partial band (e.g., partial band 330), UE 115 may select one of the set of possible CSI-RS configurations, and thereby obtain accurate CSI-RS measurements.

Figure 4:
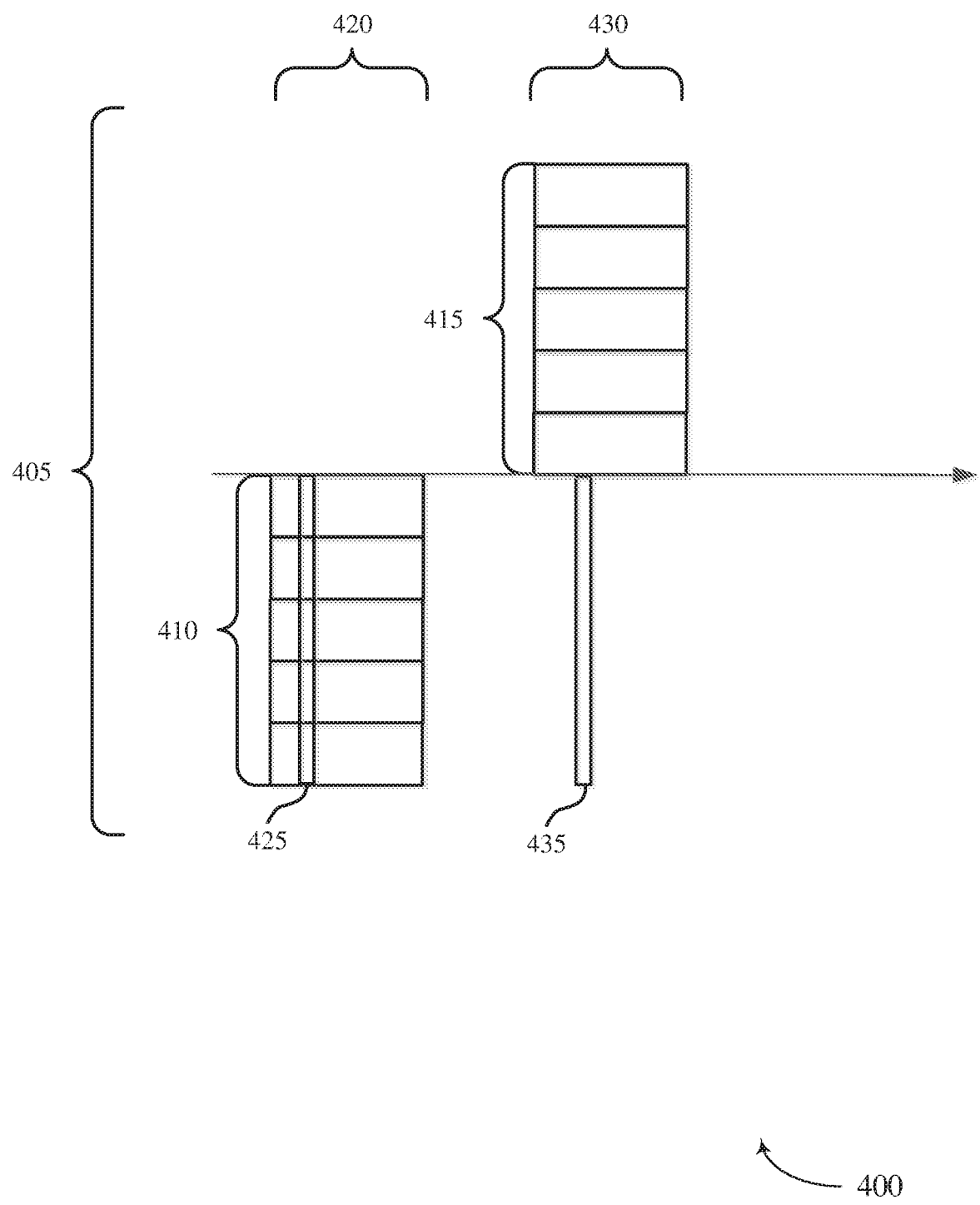
FIG. 4 illustrates an example of a partial band retuning scenario that supports CSI-RS configuration for partial band retuning in accordance with aspects of the present disclosure.

FIG. 4 illustrates an example of a partial band retuning scenario 400 that supports CSI-RS configuration for partial band retuning in accordance with various aspects of the present disclosure. In some examples, partial band retuning scenario 400 may implement aspects of wireless communications system 100 or wireless communications system 200. In some cases, the partial band retuning scenario 400 may represent aspects of techniques performed by a UE 115 or base station 105 as described with reference to FIGS. 1-3. In some cases, a UE 115 may be configured with a total system bandwidth 405 (e.g., 20 MHz, 100 MHz, etc.).

In some examples, UE 115 may be configured to communicate via a narrow band or partial band (e.g. a 5 MHz partial band, a 10 MHz, partial band, a 20 MHz partial band, etc.) within the total system bandwidth 405. In some examples, a base station 105 may dynamically configure a UE 115 to operate on different partial bands within the total system bandwidth 405. For example, UE 115 may be configured to operate on partial band 410 or partial band 415. Partial bands 410 and 415 may be the same bandwidth located at different positions in the frequency domain. Alternatively, partial bands 410 and 415 may be partial bands with different bandwidths (e.g., a 5 MHz bandwidth, a 10 MHz, bandwidth, or a 20 MHz bandwidth, etc.).

Base station 105 may transmit CSI-RS according to a pattern of resources. CSI-RS patterns are traditionally configured at the RRC layer (e.g., during establishment or reconfiguration of a connection between base station 105 and UE 115). The RRC messaging may configure a CSI-RS pattern for future transmissions. In some examples, UE 115 and base station 105 may establish or reconfigure a connection, and base station 105 may configure UE 115 to operate on partial band 410. Additionally, base station 105 may configure a CSI-RS pattern for future transmissions, such that in a first TTI 420, CSI-RS configuration 425 includes resources for CSI-RS transmissions on partial band 410. During some future TTI 430, CSI-RS configuration 435 may include additional resources for CSI-RS transmissions on partial band 410. However, RRC communications may occur with much less frequency than resource grants to UE 115. Thus, CSI-RS configurations may not be reconfigured as frequently as the location or bandwidth of resources granted to UE 115. For example, base station 105 may transmit a grant of resources to UE 115, and in response UE 115 may retune from partial band 410 to partial band 415. However, at TTI 430, the CSI-RS configuration 435 is on partial band 410. Thus, base station 105 may transmit CSI-RS on partial band 410. In such cases, it may be difficult or impossible for UE 115 to obtain accurate CSI-RS measurements corresponding to TTI 430. In such scenarios, it may be beneficial for UE configuration or CSI-RS configuration to address partial band transitions.

To address this scenario, UE 115 may be configured to send an error message or make a partial measurement upon determining that a CSI-RS configuration does not correspond to a current partial band. Additionally or alternatively, base station 105 may transmit a message to UE 115 including a set of possible CSI-RS configurations during establishment or reconfiguration of a connection. When UE 115 transitions from a first partial band (e.g. partial band 410) to a second partial band (e.g., partial band 415), UE 115 may select one of the set of possible CSI-RS configurations, and thereby obtain accurate CSI-RS measurements.

Figure 5:
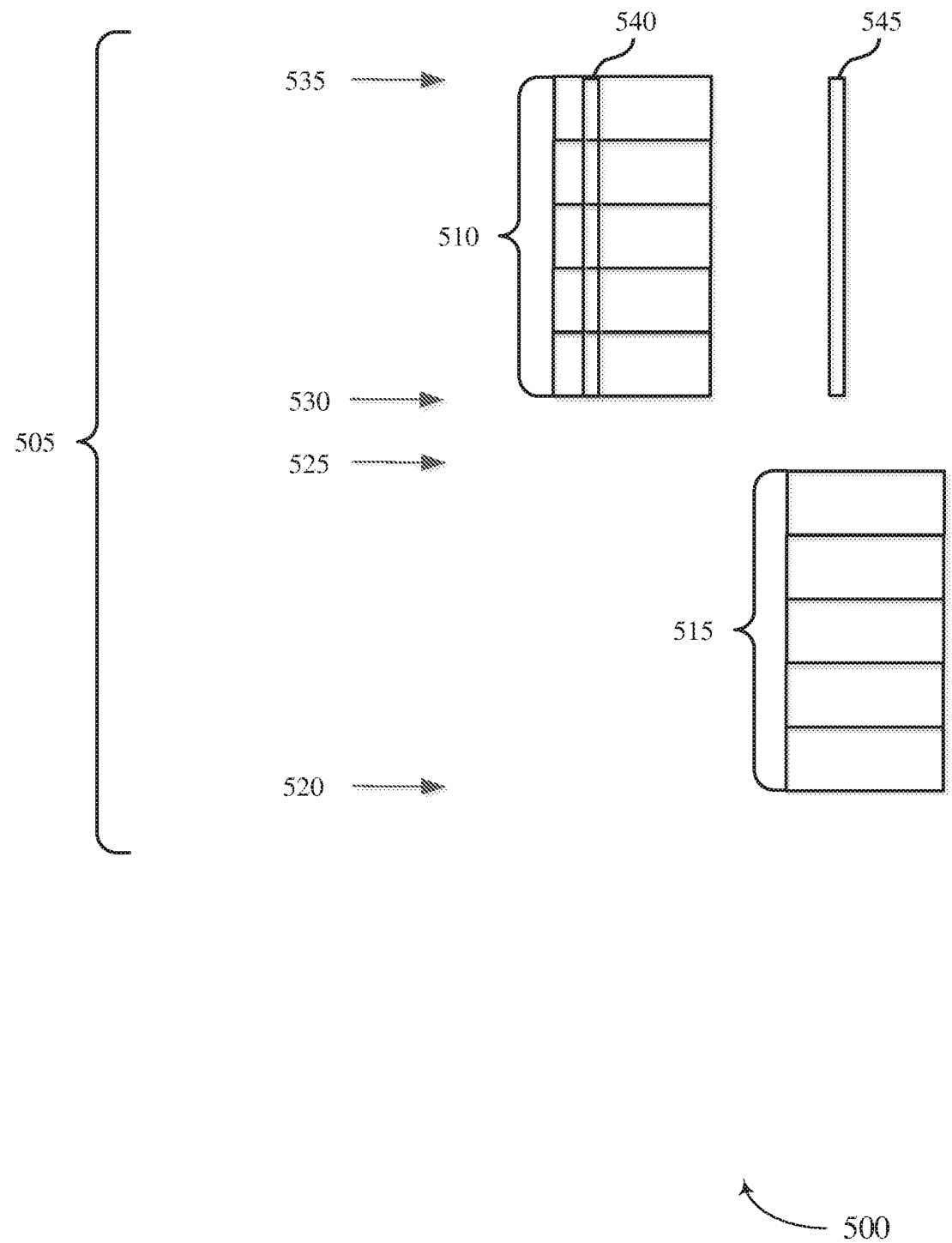
FIG. 5 illustrates an example of a partial band retuning scenario that supports CSI-RS configuration for partial band retuning in accordance with aspects of the present disclosure.

FIG. 5 illustrates an example of a partial band retuning scenario 500 that supports CSI-RS configuration for partial band retuning in accordance with various aspects of the present disclosure. In some examples, partial band retuning scenario 500 may implement aspects of wireless communications system 100. In some cases, the partial band retuning scenario 500 may represent aspects of techniques performed by a UE 115 or base station 105 as described with reference to FIGS. 1-4. In some cases, a UE 115 may be configured with a total system bandwidth 505 (e.g., 20 MHz, 100 MHz, etc.). In some examples, UE 115 may be configured to communicate via a narrow band or partial band (e.g. a 5 MHz partial band, a 10 MHz, partial band, a 20 MHz partial band, etc.) within the total system bandwidth 505. In some examples, a base station 105 may dynamically configure a UE 115 to operate on different partial bands within the total system bandwidth 505.

For example, UE 115 may be configured to operate on partial band 510 or partial band 515. Partial bands 510 and 515 may be the same bandwidth located at different positions in the frequency domain. Alternatively, partial bands 510 and 515 may be partial bands with different bandwidths (e.g., a 5 MHz bandwidth, a 10 MHz, bandwidth, or a 20 MHz bandwidth, etc.). Each partial band may include a range of resource blocks (RBs). For example, partial band 515 may include the range of RBs from RB M 520 to RB N 525. Partial band 510 may include the range of RBs from RB M+K_1 530 to N+K_2 535.

In some examples, UE 115 may receive an RRC message from base station 105. The RRC message may include CSI-RS configuration information, and an initial grant of resources. The CSI-RS configuration information may indicate CSI-RS configuration 540 on partial band 510, and CSI-RS configuration 545 on partial band 515. UE 115 may receive a grant of resources from base station 105 and may dynamically retune from partial band 510 to partial band 515. However, CSI-RS configurations may be updated less frequently than dynamic retuning occurs. Thus, UE 115 may be operating on partial band 515, and may be unable to accurately obtain CSI-RS measurements.

In such examples, UE 115 may determine whether partial band 510 overlaps with partial band 515. For instance, UE 115 may determine that RB M+K_1 530 is greater than RB N 525. In such examples, UE 115 may transmit an error message to base station 105 indicating a failure or inability to measure CSI-RS. However, if partial band 510 does overlap with partial band 515, UE 115 may be able to make some partial measurement.

Additionally or alternatively, base station 105 may transmit a message to UE 115 including a set of possible CSI-RS configurations during establishment or reconfiguration of a connection. Base station 105 may transmit a grant of resources, including DCI, which may initiate retuning at UE 115. When UE 115 transitions from a first partial band (e.g. partial band 510) to a second partial band (e.g., partial band 515), UE 115 may select one of the set of possible CSI-RS configurations received during establishment or reconfiguration of a connection, and thereby obtain accurate CSI-RS measurements.

Figure 6:
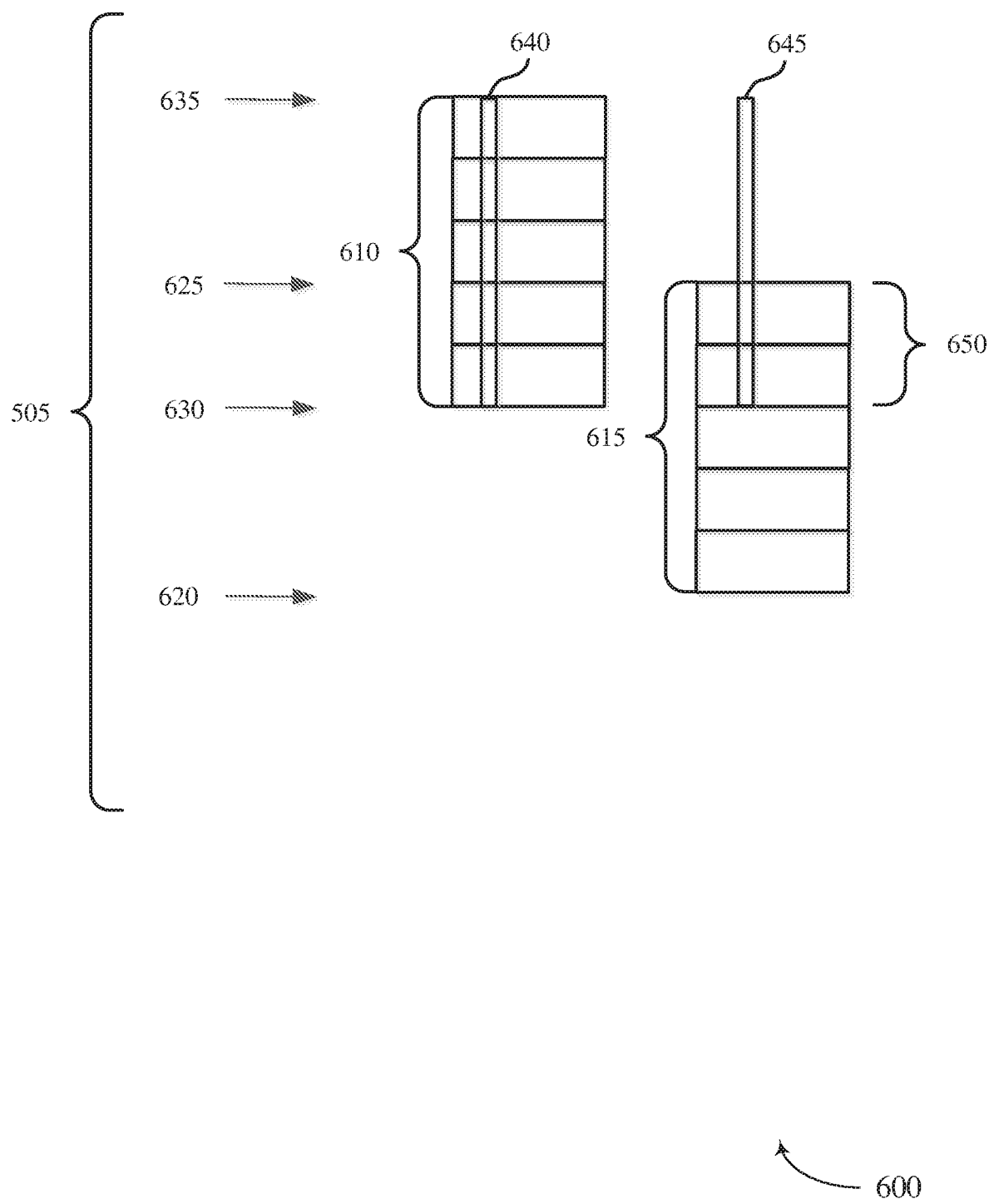
FIG. 6 illustrates an example of a partial band retuning scenario that supports CSI-RS configuration for partial band retuning in accordance with aspects of the present disclosure.

FIG. 6 illustrates an example of a partial band retuning scenario 600 that supports CSI-RS configuration for partial band retuning in accordance with various aspects of the present disclosure. In some examples, partial band retuning scenario 600 may implement aspects of wireless communications system 100. In some cases, the partial band retuning scenario 600 may represent aspects of techniques performed by a UE 115 or base station 105 as described with reference to FIGS. 1-5. In some cases, a UE 115 may be configured with a total system bandwidth 505 (e.g., 20 MHz, 100 MHz, etc.). In some examples, UE 115 may be configured to communicate via a narrow band or partial band (e.g. a 5 MHz partial band, a 10 MHz, partial band, a 20 MHz partial band, etc.) within the total system bandwidth 505. In some examples, a base station 105 may dynamically configure a UE 115 to operate on different partial bands within the total system bandwidth 505.

For example, UE 115 may be configured to operate on partial band 610 or partial band 615. Partial bands 610 and 615 may be the same bandwidth located at different positions in the frequency domain. Alternatively, partial bands 610 and 615 may be partial bands with different bandwidths (e.g., a 5 MHz bandwidth, a 10 MHz, bandwidth, or a 20 MHz bandwidth, etc.). Each partial band may include a range of resource blocks (RBs). For example, partial band 615 may include the range of RBs from RB M 620 to RB N 625. Partial band 510 may include the range of RBs from RB M+K_1 630 to N+K_2 635.

In some examples, UE 115 may receive an RRC message from base station 105. The RRC message may include CSI-RS configuration information, and an initial grant of resources. The CSI-RS configuration information may indicate CSI-RS configuration 640 on partial band 610, and CSI-RS configuration 645 on partial band 615. UE 115 may receive a grant of resources from base station 105 and may dynamically retune from partial band 610 to partial band 615. However, CSI-RS configurations may be updated less frequently than dynamic retuning occurs. Thus, UE 115 may be operating on partial band 615, and may be unable to accurately obtain complete CSI-RS measurements.

In such examples, UE 115 may determine whether partial band 610 overlaps with partial band 615. For instance, UE 115 may determine that the maximum RB corresponding to partial band 615 (RB N 625) is greater than the minimum RB corresponding to partial band 610 (RB M+K_1 530). Thus, UE 115 may determine overlapping portion 650 between partial band 610 and partial band 615. Therefore, due to retuning to partial band 615, UE 115 may be unable to take full CSI-RS measurements corresponding to CSI-RS configuration 645. However, upon determining that partial band 610 and partial band 615 overlap, UE 115 may take CSI-RS measurements over overlapping portion 650. However, in some examples it may be beneficial to address CSI-RS configuration such that UE 115 may take full CSI-RS measurements.

Additionally or alternatively, base station 105 may transmit a message to UE 115 including a set of possible CSI-RS configurations during establishment or reconfiguration of a connection. Base station 105 may transmit a grant of resources, including DCI, which may initiate retuning at UE 115. When UE 115 transitions from a first partial band (e.g. partial band 610) to a second partial band (e.g., partial band 615), UE 115 may select one of the set of possible CSI-RS configurations received during establishment or reconfiguration of a connection, and thereby obtain accurate CSI-RS measurements.

Figure 7:
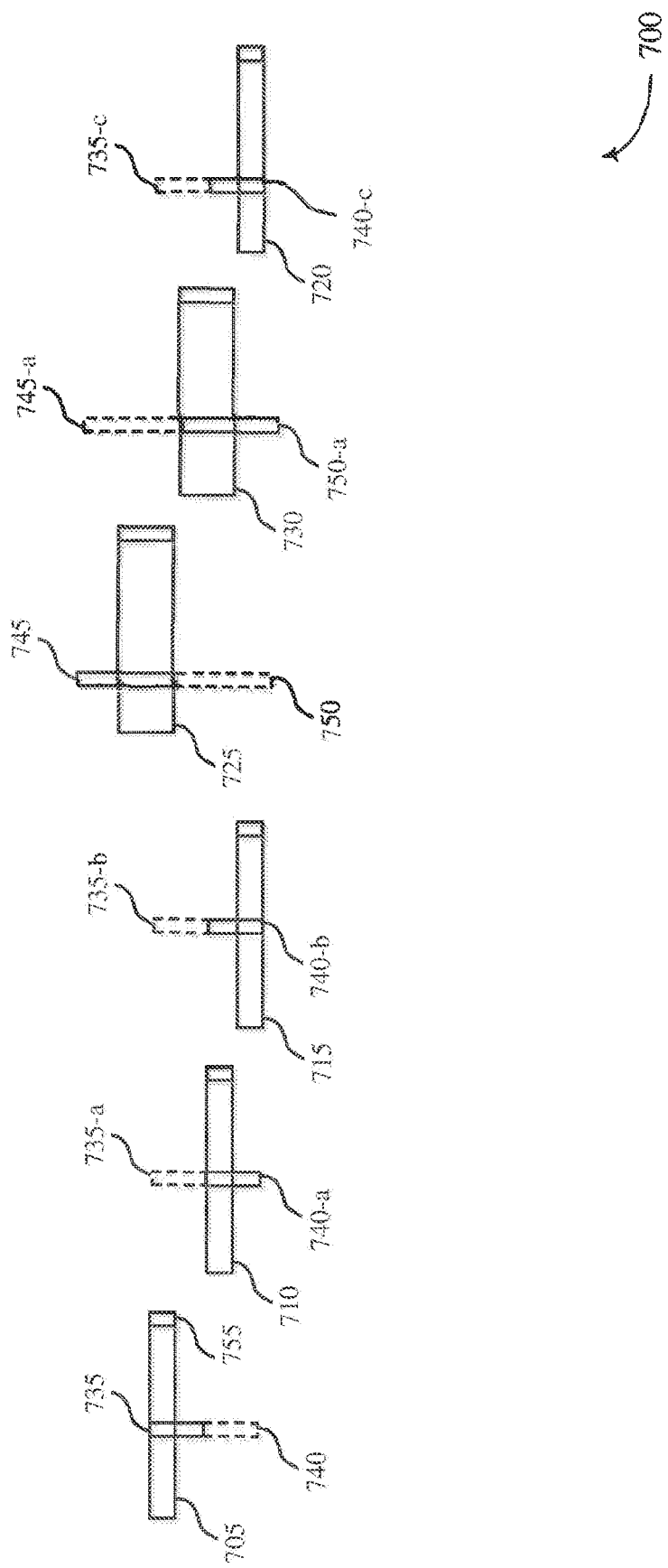
FIG. 7 illustrates an example of a partial band retuning scenario that supports CSI-RS configuration for partial band retuning in accordance with aspects of the present disclosure.

FIG. 7 illustrates an example of a partial band retuning scenario 700 that supports CSI-RS configuration for partial band retuning in accordance with various aspects of the present disclosure. In some examples, partial band retuning scenario 700 may implement aspects of wireless communications system 100. In some cases, the partial band retuning scenario 700 may represent aspects of techniques performed by a UE 115 or base station 105 as described with reference to FIGS. 1-6. In some cases, a UE 115 may be configured with a total system bandwidth (e.g., 20 MHz, 100 MHz, etc.). In some examples, UE 115 may be configured to communicate via a narrow band or partial band (e.g. a 5 MHz partial band, a 10 MHz, partial band, a 20 MHz partial band, etc.) within the total system bandwidth. In some examples, a base station 105 may dynamically configure a UE 115 to operate on different partial bands within the total system bandwidth.

For example, UE 115 may be configured to operate on partial bands which may be the same bandwidth located at different positions in the frequency domain, or partial bands with different bandwidths (e.g., a 5 MHz bandwidth, a 10 MHz, bandwidth, or a 20 MHz bandwidth, etc.). UE 115 may be dynamically configured to retune between partial bands of the same or different bandwidth. For example, partial bans 705, 710, 715, and 720 may have the same bandwidth (e.g., 5 MHz). Partial bands 725 and 730 may have the same bandwidth, which may be different from other partial bands (e.g., 10 MHz). UE 115 may operate on one partial band (e.g., partial band 705), but may receive a grant of resources and retune to a different partial band (e.g., partial band 710).

In some examples, base station 105 and UE 115 may establish or reconfigure a connection using RRC messaging. Base station 105 may transmit an RRC message, which may include a set of possible CSI-RS configurations. Each possible CSI-RS configuration in the set may include resource elements on which UE 115 may obtain CSI-RS measurements. The CSI-RS configurations may include on CSI-RS configuration per partial band. For example, the RRC message may indicate one CSI-RS configuration for a partial band with a bandwidth of 5 MHz, and a different CSI-RS configuration for a partial band with a bandwidth of 10 MHz, and yet another CSI-RS configuration for a partial band with a bandwidth of 20 MHz. Alternatively, the CSI-RS configurations may include multiple CSI-RS configurations for each partial band. In some examples, a set of possible CSI-RS configurations may include subsets of CSI-RS configurations. In some examples, possible CSI-RS configurations may correspond to particular types of CSI-RS (e.g., periodic, aperiodic, or semi-persistent CSI-RS information). Additionally or alternatively, the set of possible CSI-RS configurations may be based on a frequency location within the total bandwidth, or a partial band within the total bandwidth.

For example, the set of CSI-RS configuration may indicate a first CSI-RS configuration A1 735 corresponding to a first bandwidth (e.g. 5 MHz), and a second CST-RS configuration A2 740 corresponding to a first bandwidth (e.g. 5 MHz). Additionally, the set of CSI-RS configurations may indicate a first CSI-RS configuration B1 745 corresponding to a second bandwidth (e.g., 10 MHz), and a second CSI-RS configuration B2 750 corresponding to the second bandwidth (e.g. 10 MHz).

UE 115 may operate on partial band 705. In such a scenario, UE 115 may take CSI-RS measurements utilizing CSI-RS configuration A1 735. However, UE 115 may receive a downlink grant, which may include DCI, from base station 105. The DCI may indicate partial band retuning from partial band 705 to partial band 710. UE 115 may retune to partial band 710 during retuning gap 755. While operating on partial band 710, UE 115 may determine that a portion of CSI-RS configuration A2 740-a corresponds to partial band 710, and at the corresponding time may take CSI-RS measurements utilizing the resources of CSI-RS configuration A2 740-a. UE 115 may determine that CSI-RS configuration A2 740-a corresponds to partial band based solely on the RRC message. Alternatively, base station 105 may indicate, in the DCI, which CSI-RS configuration UE 115 should utilize in obtaining CSI-RS measurements.

UE 115 may receive an additional downlink grant, and may retune to partial band 715 in response to the grant. UE 115 may determine that a different portion of CSI-RS configuration A2 740-a corresponds to partial band 715, and may take CSI-RS measurements utilizing the resources of CSI-RS configurations A2 740-b. UE 115 may determine that CSI-RS configuration A2 740-b corresponds to partial band 715 based solely on the RRC message or based on the DCI that triggered retuning from partial band 710 to partial band 715.

UE 115 may receive another downlink grant, indicating retuning from partial band 715 to partial band 725. Partial band 725 may be have a different bandwidth than partial band 715. For example, partial band 725 be a 10 MHz partial band. UE 115 may determine that a portion of CSI-RS configuration B1 745 corresponds to partial band 725, and at the corresponding time may take CSI-RS measurements utilizing the resources of CSI-RS configuration B1 745. However, when UE 115 receives another downlink grant, UE 115 may retune to partial band 730, which may have the same bandwidth as partial band 725. UE 115 may determine that at least a portion of CSI-RS configuration B2 750-b corresponds to partial band 730, and may take CSI-RS measurements based thereon.

UE 115 may determine which CSI-RS configuration corresponds to a current partial base band based solely on the RRC message or based on the DCI that triggered retuning from partial band 710 to partial band 715. For example, CSI-RS configuration B2 750-a may be the only CSI-RS configuration that corresponds to partial band 730. In such examples, UE 115 may determine to take measurements utilizing that CSI-RS configuration based solely on the RRC message. However, in some cases, there may be multiple CSI-RS configurations that apply to a given partial band. In such cases, base station 105 may include in the DCI a direction to retune to a partial band, and an indication of which CSI-RS configuration corresponding to that partial band to utilize for CSI-RS measurements. In such examples, UE 115 may determine which CSI-RS configuration to utilize based on the DCI.

Figure 8:
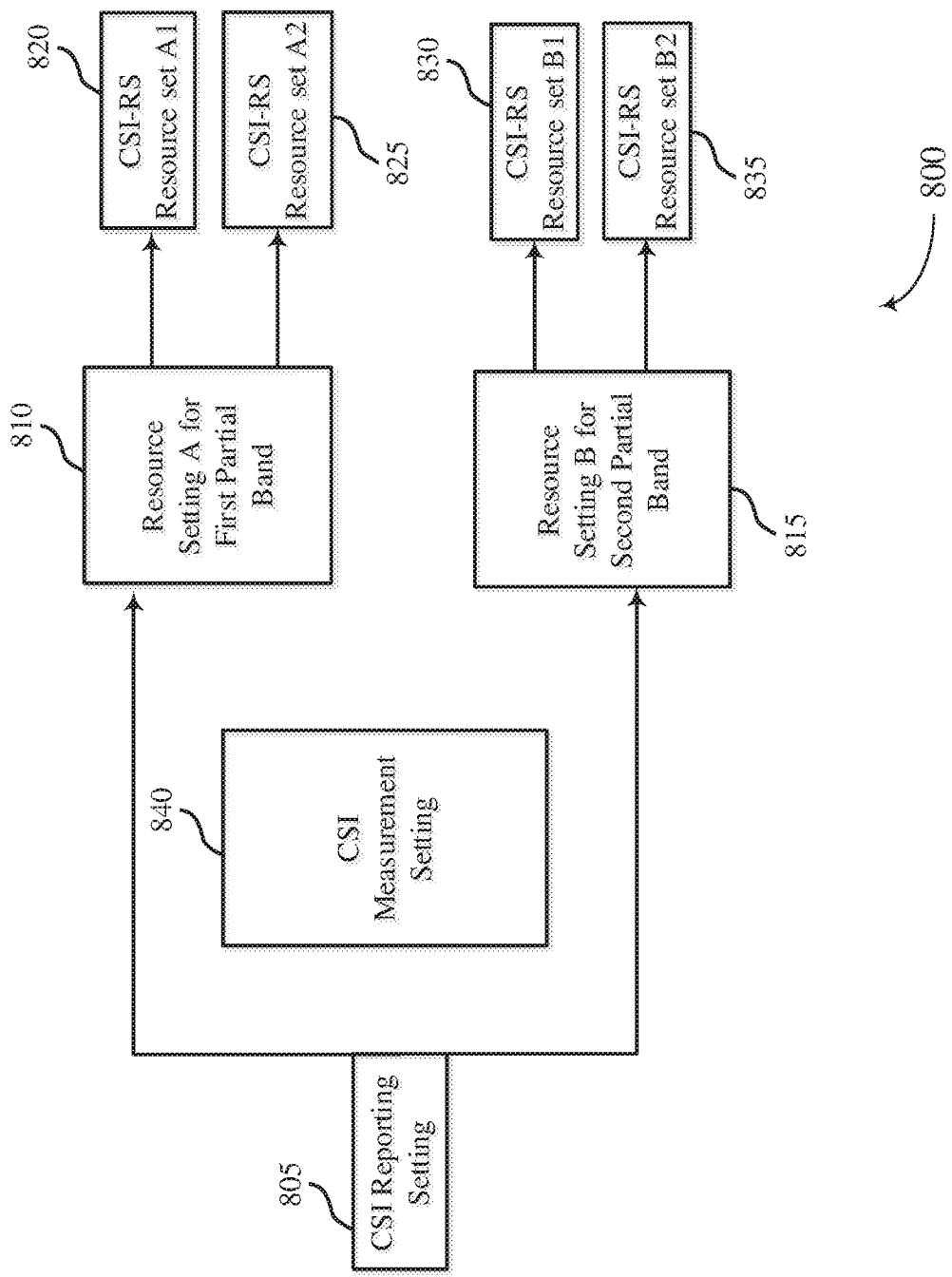
FIG. 8 illustrates an example of a CSI-RS configuration setting that supports CSI-RS configuration for partial band retuning in accordance with aspects of the present disclosure.

FIG. 8 illustrates an example of a CSI-RS configuration hierarchy 800 that supports CSI-RS configuration for partial band retuning in accordance with various aspects of the present disclosure. In some examples, CSI-RS configuration setting 800 may implement aspects of wireless communications system 100. In some cases, configuration setting 800 may represent aspects of techniques performed by a UE 115 or base station 105 as described with reference to FIGS. 1-7. In some cases, a base station 105 may dynamically configure a UE 115 to operate on different partial bands within the system bandwidth. In such examples, base station 105 may include in an RRC message a CSI measurement setting, which may include one or more sets of CSI-RS configurations.

Base station 105 may configure a CSI reporting setting 805. The CSI Reporting Setting may include one or more sets of possible CSI-RS configurations. The CSI-RS configurations may be organized such that a UE 115-*a* may select an appropriate CSI-RS configuration based on a variety of criteria including frequency of a partial band, bandwidth of a partial band, or time domain behavior.

For example, CSI-RS configurations within the CSI reporting setting 805 may include a resource setting A 810 for a first partial band, and a resource setting B 815 for a second partial band. Resource setting A 810 may include multiple CSI-RS configurations including different sets of CSI-RS resources. For example, resource setting A 810 may include CSI-RS resource set A1 820 and CSI-RS resource set A2 825, both of which may be options that correspond to the first partial band. Resource setting 815 may include CSI-RS resource set B1 830 and CSI-RS resource set B2 835, both of which may be options that correspond to the second partial band.

Base station 105 may transmit a CSI measurement setting 840 to UE 115, which may be included in the DCI or MAC CE signaling. For example, base station 105 may include in the DCI a resource grant corresponding to a first partial band. CSI measurement setting 840 may then indicate that UE 115 will be operating on the first partial band and therefore should utilize resource setting A 810. Furthermore, UE 115 may select one of CSI-RS resource set A1 820 or CSI-RS resource set A2 825 based on a location of the narrowband in the frequency domain. For example, the first partial band may be a 5 MHz partial band. If the 5 MHz partial band is located at a higher frequency range, UE 115 may select CSI-RS resource set A1 820. Alternatively, if the 5 MHz partial band is located at a lower frequency range, UE 115 may select CSI-RS resource set A2 825.

Figure 9:
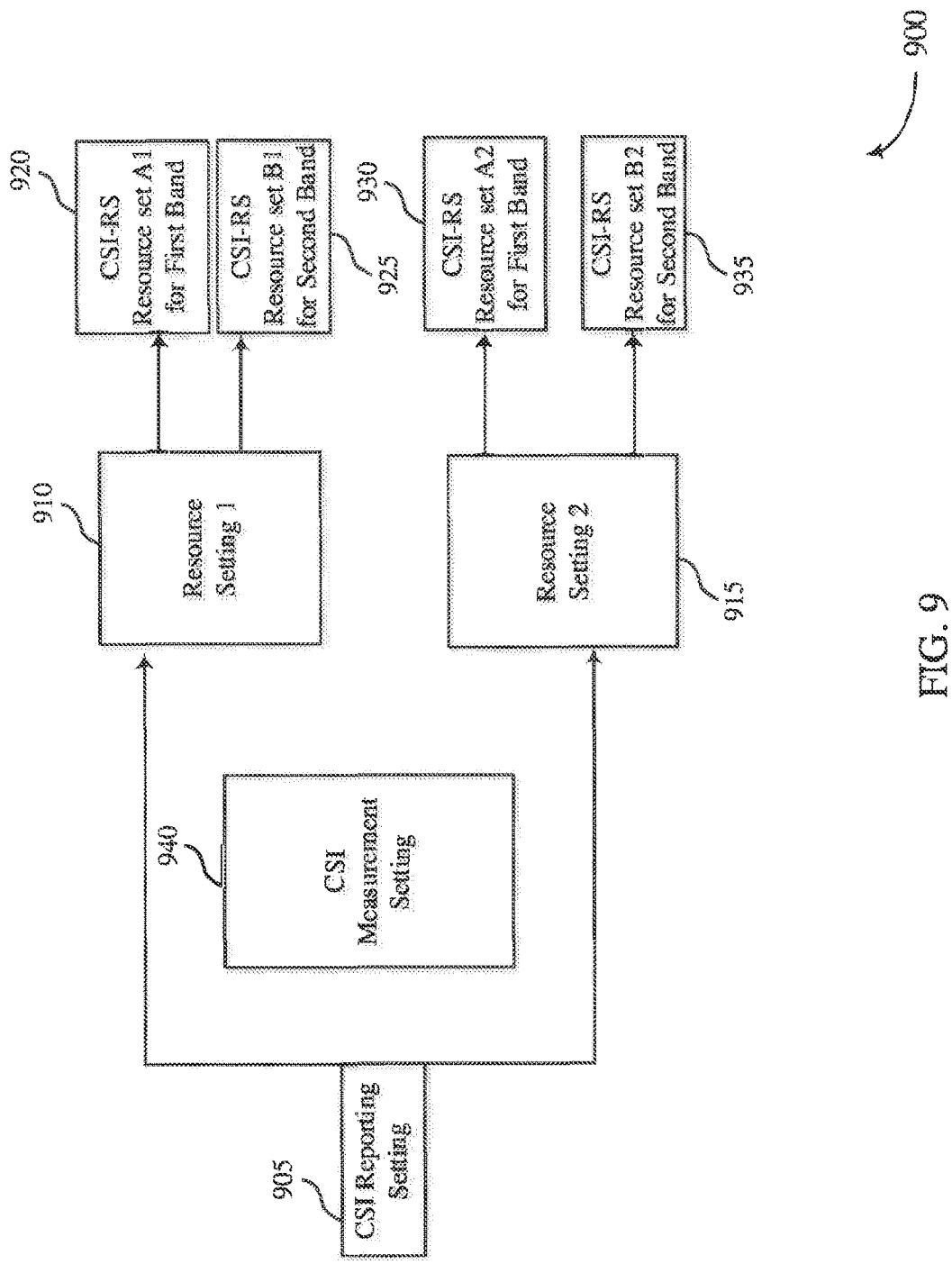
FIG. 9 illustrates an example of a CSI-RS configuration setting that supports CSI-RS configuration for partial band retuning in accordance with aspects of the present disclosure.

FIG. 9 illustrates an example of a CSI-RS configuration hierarchy 900 that supports CSI-RS configuration for partial band retuning in accordance with various aspects of the present disclosure. In some examples, CSI-RS configuration setting 900 may implement aspects of wireless communications system 100. In some cases, configuration setting 900 may represent aspects of techniques performed by a UE 115 or base station 105 as described with reference to FIGS. 1-8. In some cases, a base station 105 may dynamically configure a UE 115 to operate on different partial bands within the system bandwidth. In such examples, base station 105 may include in an RRC message a CSI measurement setting, which may include one or more sets of CSI-RS configurations.

Base station 105 may configure a CSI reporting setting 905. The CSI Reporting Setting may include one or more sets of possible CSI-RS configurations. The CSI-RS configurations may be organized such that a UE 115-*a* may select an appropriate CSI-RS configuration based on a variety of criteria including frequency of a partial band, bandwidth of a partial band, or time domain behavior.

For example, CSI-RS configurations within the CSI reporting setting 805 may include a resource setting 1 910 and a resource setting 2. Resource setting A 910 may include multiple CSI-RS configurations including different sets of CSI-RS resources. For example, resource setting 1 910 may include CSI-RS resource set A1 920 for a first band and CSI-RS resource set B1 925 for a second band. Resource setting 2 915 may include CSI-RS resource set A2 930 for the first band and CSI-RS resource set B2 935 for the second band.

Base station 105 may transmit a CSI measurement setting 940 to UE 115, which may be included in the DCI or MAC CE signaling. For example, base station 105 may include in the DCI a resource grant corresponding to a first partial band. In some examples, resource setting 1 910 may correspond to a higher portion of the frequency domain, and resource setting 2 915 may correspond to a lower portion of the frequency domain. CSI measurement setting 940 may indicate that UE 115 will be operating on a partial band at a particular place in the frequency domain. For example, UE 115 may retune to a partial band corresponding to a higher portion of the frequency domain, and therefore may utilize resource setting 1 910.

Furthermore, UE 115 may be operating on a particular band, such as a first band. In such examples, UE 115 may select one of CSI-RS resource set A1 920 or CSI-RS resource set B1 925 based on which partial band it has been assigned. For example, the first partial band may be a 5 MHz partial band. UE 115 may determine that CSI-RS resource set A1 920 corresponds to a 5 MHz partial band, and may select that CSI-RS configuration based thereon. Similarly, if the DCI indicates that UE 115 should retune to a 10 MHz partial band in a lower portion of the frequency domain, UE 115 may select resource setting 2, and within resource setting 2 may select CSI-RS resource set B2 for second band 935, if the second band is a 10 MHz band.

Figure 10:
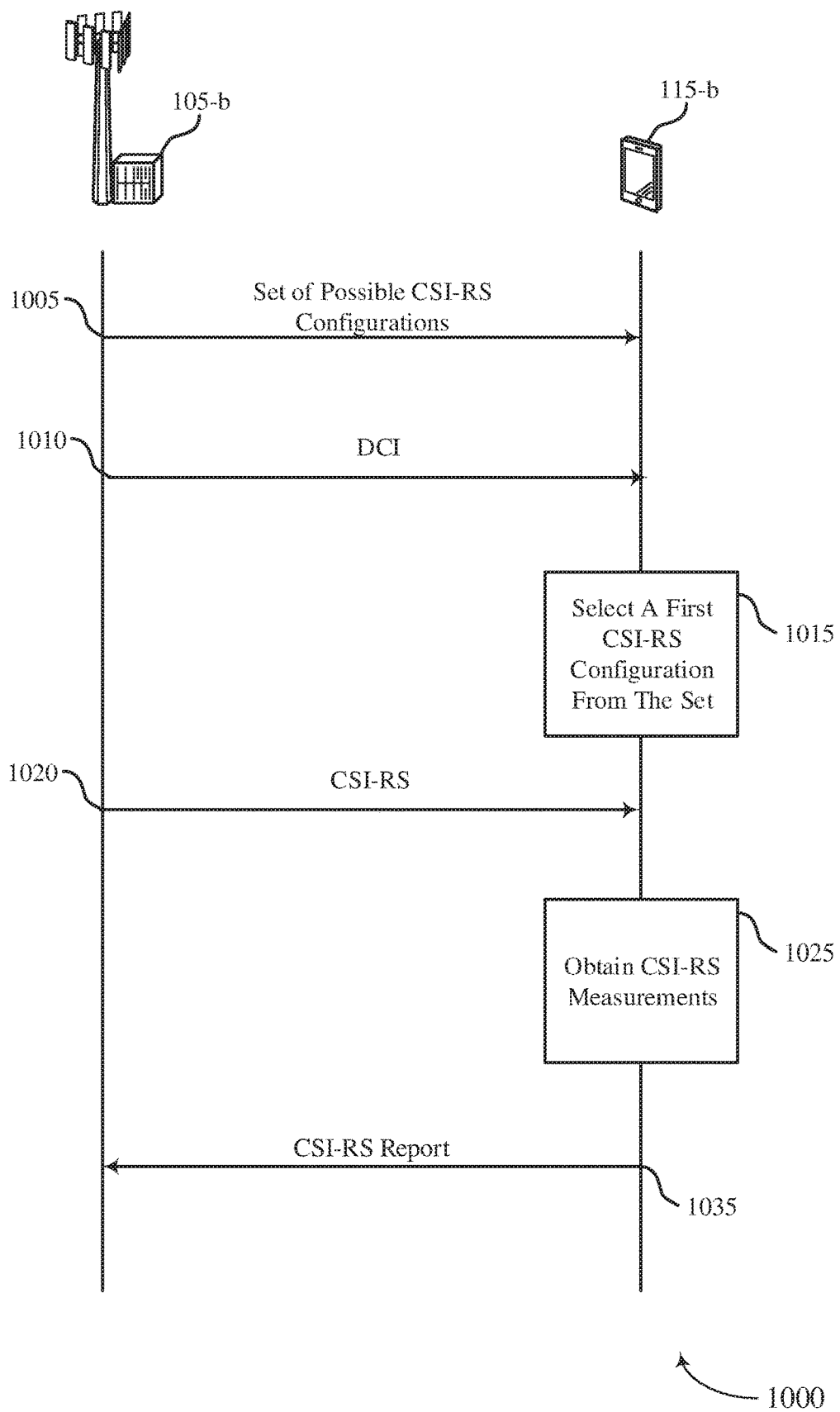
FIG. 10 illustrates an example of a process flow that supports CSI-RS configuration for partial band retuning in accordance with aspects of the present disclosure.

FIG. 10 illustrates an example of a process flow 1000 that supports CSI-RS configuration for partial band retuning in accordance with various aspects of the present disclosure. In some examples, process flow 1000 may implement aspects of wireless communications system 100. Process flow 1000 may include base station 105-*b* and UE 115-*b*, which may be examples of or which may represent aspects of techniques performed by a UE 115 or base station 105 as described with reference to FIGS. 1-9.

At 1005, base station 105-*b* may transmit a message to a user equipment (UE) indicating, for each partial band of a plurality of partial bands within a total configured bandwidth of the UE, a set of possible CSI-RS configurations. For example, the message may be an RRC Connection Setup message or an equivalent message in response to an RRC Connection Request message or an equivalent message. Alternatively, the message may be an RRC Connection Reconfiguration message or an equivalent message. Base station 105-*b* may include in the RRC message information regarding CSI-RS time domain behavior. For instance, base station 105-*b* may configure CSI-RS transmissions to be periodic, or aperiodic. Alternatively, base station 105-*b* may configure UE 115-*b* to take aperiodic CSI-RS measurements, which may be triggered dynamically. For instance, base station 105-*b* may transmit information regarding partial band retuning and aperiodic CSI-RS configurations with DCI at 1010. Furthermore, the he transmitted message may be an RRC message or a MAC layer message.

At 1010, base station 105-*b* may transmit DCI to the UE, the DCI indicating a set of downlink resources associated with a first partial band of the plurality of partial bands. The DCI may be sent over a physical downlink control channel (PDCCH), and the set of downlink resources may be indicated in a downlink grant. The DCI may include explicit or implicit instructions to retune a receiver of the UE to the first partial band from a second partial band based on the downlink resources indicated in the DCI. In some examples, the DCI may also include an explicit or implicit indication of which of the set of possible CSI-RS configurations UE 115-*b* may utilize in the DCI.

For example, the DCI may indicate to UE 115-*b* that it will retune from a first partial band to a second partial band. In some examples, UE 115-*b* may have received a set of possible CSI-RS configurations at 1005 in which one CSI-RS configuration corresponds to each band. In such examples, UE 115-*b* may determine a CSI-RS configuration, merely by identifying the partial band to which it will tune. Alternatively, the message received at 1005 may include multiple CSI-RS configurations for each partial band. In such examples, the DCI may include an explicit indication of which of the possible CSI-RS configurations corresponding to the new partial band should be utilized by UE 115-*b*. For instance, the DCI may include a bitmap indication one of the possible CSI-RS configurations. If the message received at 1005 indicates four possible CSI-RS configurations, the bitmap may include two bits, indicating which of the four possibilities should be utilized by UE 115-*b*.0

Additionally or alternatively, the DCI may include characteristics based on which UE 115-*b* should determine which CSI-RS configuration to use. Characteristics upon which UE 115-*b* may make its determination may include a location in the frequency domain, and bandwidth of a partial band. For example, the DCI may indicate that if UE 115-*b* is retuning to a first bandwidth, to utilize a particular CSI-RS if the bandwidth falls at a low frequency in the frequency domain, and a different CSI-RS if the bandwidth falls at a higher frequency in the frequency domain.

At 1015, UE 115-*b* may select a first CSI-RS configuration from the set of possible CSI-RS configurations for the first partial band based at least in part on the DCI. UE 115-*b* may retune a receiver of the UE to the first partial band from a second partial band based at least in part on the received DCI. UE 115-*b* may select a CSI-RS configuration based at least in part periodic CSI-RS information, aperiodic CSI-RS information, or semi-persistent CSI-RS information in the message received at 1005.

In some examples, the set of possible CSI-RS configurations comprises at least two subsets of possible CSI-RS configurations corresponding to different CSI-RS time-domain characteristics. At least one of the subsets of possible CSI-RS configurations may correspond to periodic CSI-RS configurations, an aperiodic CSI-RS configuration, or a semi-persistent CSI-RS configuration. In some examples, UE 115-*b* may compare the time domain CSI-RS configurations it receives at 1005 to the set of possible CSI-RS configurations and the granted resources at 1010. Based on the granted resources (i.e., the partial band to which it retunes), the set of possible configurations, and current timing, UE 115-*b* may select a CSI-RS configuration. If the CSI-RS configurations are periodic, UE 115-*b* may determine when the next periodic CSI-RS transmission will occur, and the corresponding CSI-RS configuration. If the CSI-RS is aperiodic, UE 115-*b* may determine which CSI-RS configuration to select based on an indication included in the DCI. At 1020, base station 105-*b* may perform CSI-RS transmissions during the set of downlink resources according to the determined CSI-RS configuration.

At 1025, UE 115-*b* may obtain CSI-RS measurements over the first partial band during the set of downlink resources using the selected first CSI-RS configuration. In some examples, at least one CSI-RS configuration of the set of possible CSI-RS configurations corresponds to a zero power (ZP) CSI-RS, and at least one CSI-RS configuration of the set of possible CSI-RS configurations corresponds to a non-zero power (NZP) CSI-RS. At 1030, UE 115-*b* may transmit a channel state information (CSI) report to the base station based at least in part on the CSI-RS measurements over the first partial band.

Figure 11:
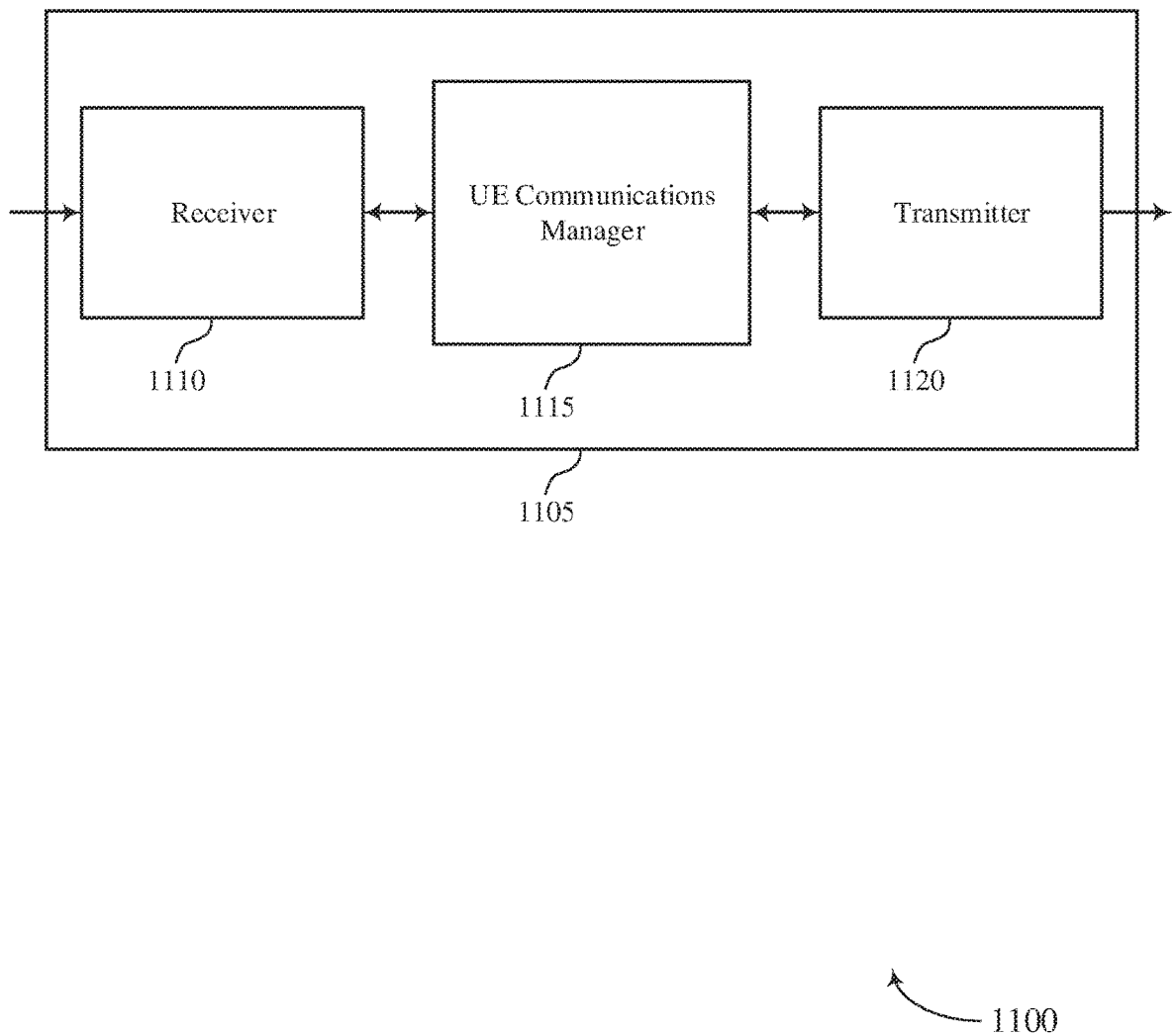
FIGS. 11 through 13 show block diagrams of a device that supports CSI-RS configuration for partial band retuning in accordance with aspects of the present disclosure.

FIG. 11 shows a block diagram 1100 of a wireless device 1105 that supports channel state information (CST)-RS configuration for partial band retuning in accordance with aspects of the present disclosure. Wireless device 1105 may be an example of aspects of a user equipment (UE) 115 as described herein. Wireless device 1105 may include receiver 1110, UE communications manager 1115, and transmitter 1120. Wireless device 1105 may also include a processor. Each of these components may be in communication with one another (e.g., via one or more buses).

Receiver 1110 may receive information such as packets, user data, or control information associated with various information channels (e.g., control channels, data channels, and information related to CSI-RS configuration for partial band retuning, etc.). Information may be passed on to other components of the device. The receiver 1110 may be an example of aspects of the transceiver 1435 described with reference to FIG. 14. The receiver 1110 may utilize a single antenna or a set of antennas. UE communications manager 1115 may be an example of aspects of the UE communications manager 1415 described with reference to FIG. 14.

UE communications manager 1115 and/or at least some of its various sub-components may be implemented in hardware, software executed by a processor, firmware, or any combination thereof. If implemented in software executed by a processor, the functions of the UE communications manager 1115 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

The UE communications manager 1115 and/or at least some of its various sub-components may be physically located at various positions, including being distributed such that portions of functions are implemented at different physical locations by one or more physical devices. In some examples, UE communications manager 1115 and/or at least some of its various sub-components may be a separate and distinct component in accordance with various aspects of the present disclosure. In other examples, UE communications manager 1115 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 1115 may receive from a base station a message indicating, for each partial band of a set of partial bands within a total configured bandwidth of the UE, a set of possible CSI-RS configurations, receive DCI from the base station, the DCI indicating a set of downlink resources associated with a first partial band of the set of partial bands, select a first CSI-RS configuration from the set of possible CSI-RS configurations for the first partial band based on the DCI, and obtain CSI-RS measurements over the first partial band during the set of downlink resources using the selected first CSI-RS configuration. The UE communications manager 1115 may also receive from a base station a CSI-RS configuration associated with a first partial band within a total configured bandwidth of the UE, receive DCI from the base station, the DCI indicating a set of downlink resources associated with a second partial band within the total configured bandwidth of the UE, and transmit one of an error message or a partial CSI report to the base station based on a degree of overlap between the first partial band and the second partial band.

Transmitter 1120 may transmit signals generated by other components of the device. In some examples, the transmitter 1120 may be collocated with a receiver 1110 in a transceiver module. For example, the transmitter 1120 may be an example of aspects of the transceiver 1435 described with reference to FIG. 14. The transmitter 1120 may utilize a single antenna or a set of antennas.

Figure 12:
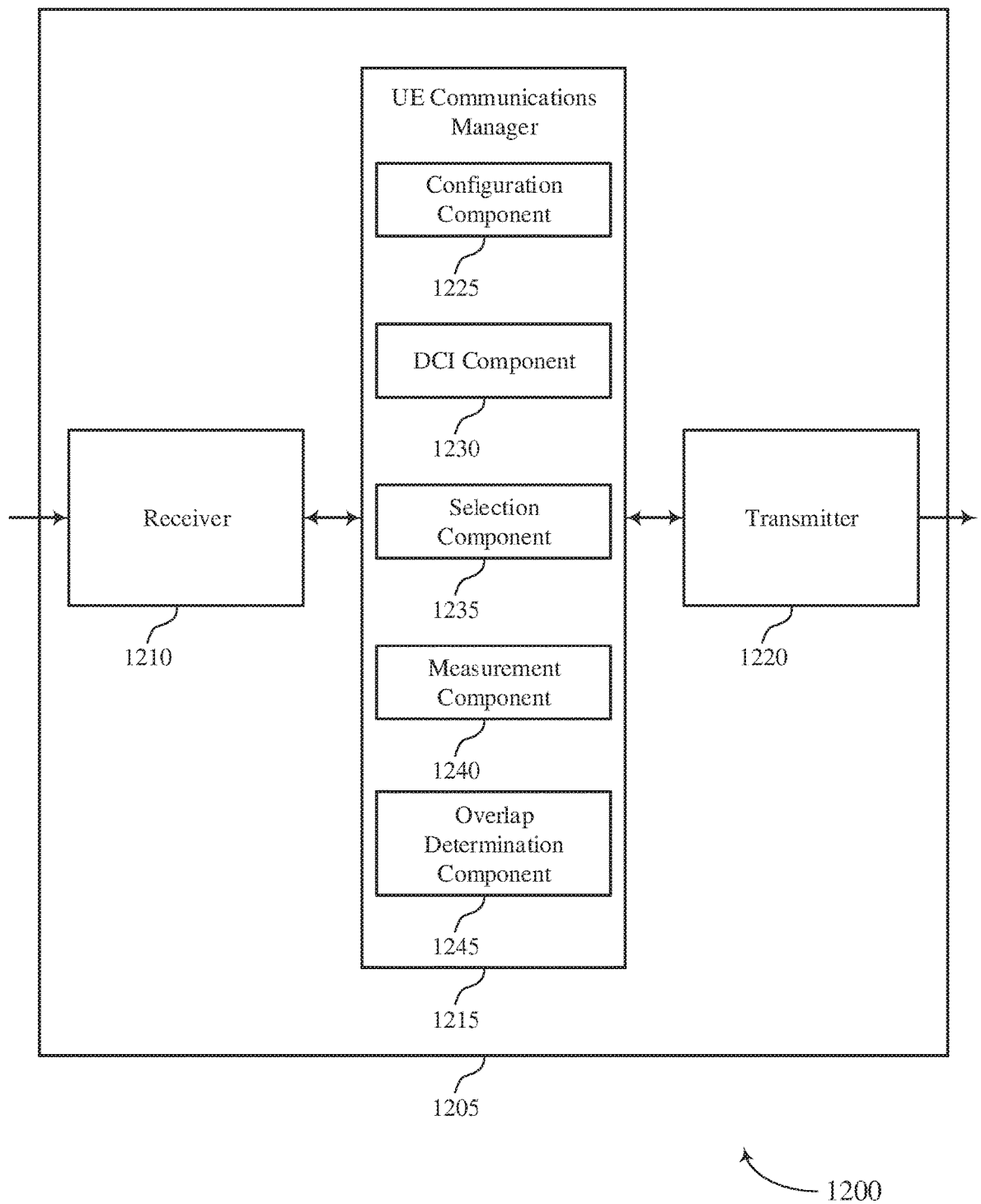

FIG. 12 shows a block diagram 1200 of a wireless device 1205 that supports CSI-RS configuration for partial band retuning in accordance with aspects of the present disclosure. Wireless device 1205 may be an example of aspects of a wireless device 1105 or a UE 115 as described with reference to FIG. 11. Wireless device 1205 may include receiver 1210, UE communications manager 1215, and transmitter 1220. Wireless device 1205 may also include a processor. Each of these components may be in communication with one another (e.g., via one or more buses).

Receiver 1210 may receive information such as packets, user data, or control information associated with various information channels (e.g., control channels, data channels, and information related to CSI-RS configuration for partial band retuning, etc.). Information may be passed on to other components of the device. The receiver 1210 may be an example of aspects of the transceiver 1435 described with reference to FIG. 14. The receiver 1210 may utilize a single antenna or a set of antennas.

UE communications manager 1215 may be an example of aspects of the UE communications manager 1415 described with reference to FIG. 14 UE communications manager 1215 may also include configuration component 1225, DCI component 1230, selection component 1235, measurement component 1240, and overlap determination component 1245.

Configuration component 1225 may receive from a base station a message indicating, for each partial band of a set of partial bands within a total configured bandwidth of the UE, a set of possible CSI-RS configurations and receive from a base station a CSI-RS configuration associated with a first partial band within a total configured bandwidth of the UE. In some cases, the received message is a radio resource control (RRC) message. In some cases, the received message is a media access control (MAC) layer message. In some cases, at least one CSI-RS configuration of the set of possible CSI-RS configurations corresponds to a zero power (ZP) CSI-RS, and at least one CSI-RS configuration of the set of possible CSI-RS configurations corresponds to a non-zero power (NZP) CSI-RS. In some cases, the set of possible CSI-RS configurations includes at least two subsets of possible CSI-RS configurations corresponding to different CSI-RS time-domain characteristics. In some cases, at least one of the subsets of possible CSI-RS configurations corresponds to periodic CSI-RS configurations. In some cases, at least one of the subsets of possible CSI-RS configurations corresponds to aperiodic CSI-RS configurations. In some cases, at least one of the subsets of possible CSI-RS configurations corresponds to semi-persistent CSI-RS configurations.

DCI component 1230 may receive DCI from the base station, the DCI indicating a set of downlink resources associated with a first partial band of the set of partial bands and receive DCI from the base station, the DCI indicating a set of downlink resources associated with a second partial band within the total configured bandwidth of the UE.

Selection component 1235 may select a first CSI-RS configuration from the set of possible CSI-RS configurations for the first partial band based on the DCI, select one or more CSI-RS configuration from the set of possible CSI-RS configurations for the first partial band based on periodic CSI-RS information in the received message, and select one or more CSI-RS configuration from the set of possible CSI-RS configurations for the first partial band based on semi-persistent CSI-RS information in the received message. In some cases, selecting the CSI-RS configuration includes: receiving an indication of the first CSI-RS configuration in the DCI. Measurement component 1240 may obtain CSI-RS measurements over the first partial band during the set of downlink resources using the selected first CSI-RS configuration.

Overlap determination component 1245 may transmit one of an error message or a partial CSI report to the base station based on a degree of overlap between the first partial band and the second partial band, determine that the first partial band and the second partial band do not overlap, transmit the error message based on the determining, determine a portion of the first partial band that overlaps with the second partial band, and obtain CSI-RS measurements over the portion of the first partial band that overlaps with the second partial band.

Transmitter 1220 may transmit signals generated by other components of the device. In some examples, the transmitter 1220 may be collocated with a receiver 1210 in a transceiver module. For example, the transmitter 1220 may be an example of aspects of the transceiver 1435 described with reference to FIG. 14. The transmitter 1220 may utilize a single antenna or a set of antennas.

Figure 13:
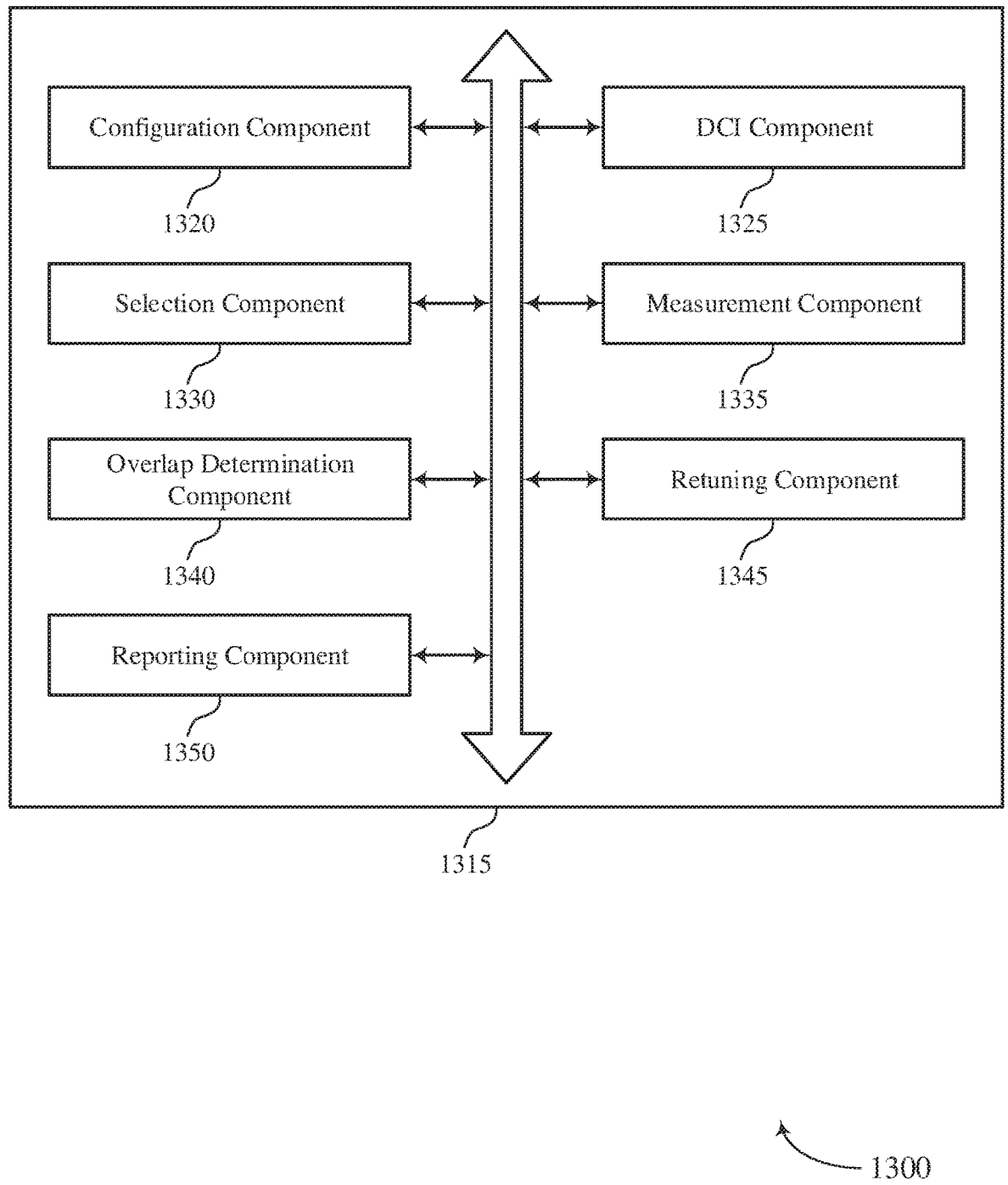

FIG. 13 shows a block diagram 1300 of a UE communications manager 1315 that supports CSI-RS configuration for partial band retuning in accordance with aspects of the present disclosure. The UE communications manager 1315 may be an example of aspects of a UE communications manager 1115, a UE communications manager 1215, or a UE communications manager 1415 described with reference to FIGS. 11, 12, and 14. The UE communications manager 1315 may include configuration component 1320, DCI component 1325, selection component 1330, measurement component 1335, overlap determination component 1340, retuning component 1345, and reporting component 1350. Each of these modules may communicate, directly or indirectly, with one another (e.g., via one or more buses).

Configuration component 1320 may receive from a base station a message indicating, for each partial band of a set of partial bands within a total configured bandwidth of the UE, a set of possible CSI-RS configurations and receive from a base station a CSI-RS configuration associated with a first partial band within a total configured bandwidth of the UE. In some cases, the received message is a RRC message. In some cases, the received message is a MAC layer message. In some cases, at least one CSI-RS configuration of the set of possible CSI-RS configurations corresponds to a zero power (ZP) CSI-RS, and at least one CSI-RS configuration of the set of possible CSI-RS configurations corresponds to a non-zero power (NZP) CSI-RS. In some cases, the set of possible CSI-RS configurations includes at least two subsets of possible CSI-RS configurations corresponding to different CSI-RS time-domain characteristics. In some cases, at least one of the subsets of possible CSI-RS configurations corresponds to periodic CSI-RS configurations. In some cases, at least one of the subsets of possible CSI-RS configurations corresponds to aperiodic CSI-RS configurations. In some cases, at least one of the subsets of possible CSI-RS configurations corresponds to semi-persistent CSI-RS configurations.

DCI component 1325 may receive DCI from the base station, the DCI indicating a set of downlink resources associated with a first partial band of the set of partial bands and receive DCI from the base station, the DCI indicating a set of downlink resources associated with a second partial band within the total configured bandwidth of the UE.

Selection component 1330 may select a first CSI-RS configuration from the set of possible CSI-RS configurations for the first partial band based on the DCI, select one or more CSI-RS configuration from the set of possible CSI-RS configurations for the first partial band based on periodic CSI-RS information in the received message, and select one or more CSI-RS configuration from the set of possible CSI-RS configurations for the first partial band based on semi-persistent CSI-RS information in the received message. In some cases, selecting the CSI-RS configuration includes: receiving an indication of the first CSI-RS configuration in the DCI. Measurement component 1335 may obtain CSI-RS measurements over the first partial band during the set of downlink resources using the selected first CSI-RS configuration.

Overlap determination component 1340 may transmit one of an error message or a partial CSI report to the base station based on a degree of overlap between the first partial band and the second partial band, determine that the first partial band and the second partial band do not overlap, transmit the error message based on the determining, determine a portion of the first partial band that overlaps with the second partial band, and obtain CSI-RS measurements over the portion of the first partial band that overlaps with the second partial band.

Retuning component 1345 may retune a receiver of the UE to the first partial band from a second partial band based on the received DCI. Reporting component 1350 may transmit a CSI report to the base station based on the CSI-RS measurements over the first partial band.

Figure 14:
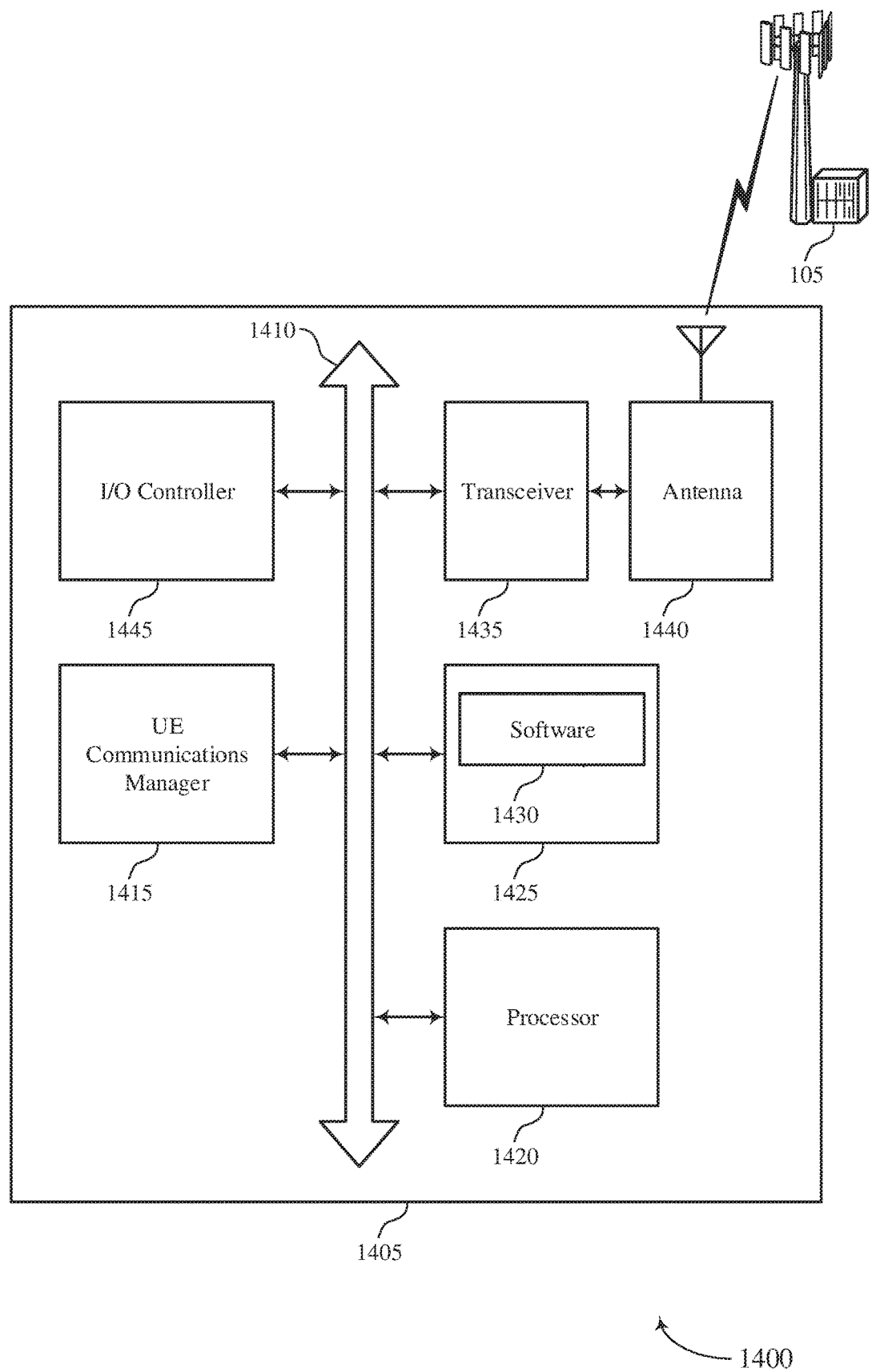
FIG. 14 illustrates a block diagram of a system including a UE that supports CSI-RS configuration for partial band retuning in accordance with aspects of the present disclosure.

FIG. 14 shows a diagram of a system 1400 including a device 1405 that supports CSI-RS configuration for partial band retuning in accordance with aspects of the present disclosure. Device 1405 may be an example of or include the components of wireless device 1105, wireless device 1205, or a UE 115 as described above, e.g., with reference to FIGS. 11 and 12. Device 1405 may include components for bi-directional voice and data communications including components for transmitting and receiving communications, including UE communications manager 1415, processor 1420, memory 1425, software 1430, transceiver 1435, antenna 1440, and I/O controller 1445. These components may be in electronic communication via one or more buses (e.g., bus 1410). Device 1405 may communicate wirelessly with one or more base stations 105.

Processor 1420 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1420 may be configured to operate a memory array using a memory controller. In other cases, a memory controller may be integrated into processor 1420. Processor 1420 may be configured to execute computer-readable instructions stored in a memory to perform various functions (e.g., functions or tasks supporting CSI-RS configuration for partial band retuning).

Memory 1425 may include random access memory (RAM) and read only memory (ROM). The memory 1425 may store computer-readable, computer-executable software 1430 including instructions that, when executed, cause the processor to perform various functions described herein. In some cases, the memory 1425 may contain, among other things, a basic input/output system (BIOS) which may control basic hardware or software operation such as the interaction with peripheral components or devices.

Software 1430 may include code to implement aspects of the present disclosure, including code to support CSI-RS configuration for partial band retuning. Software 1430 may be stored in a non-transitory computer-readable medium such as system memory or other memory. In some cases, the software 1430 may not be directly executable by the processor but may cause a computer (e.g., when compiled and executed) to perform functions described herein.

Transceiver 1435 may communicate bi-directionally, via one or more antennas, wired, or wireless links as described above. For example, the transceiver 1435 may represent a wireless transceiver and may communicate bi-directionally with another wireless transceiver. The transceiver 1435 may also include a modem to modulate the packets and provide the modulated packets to the antennas for transmission, and to demodulate packets received from the antennas.

In some cases, the wireless device may include a single antenna 1440. However, in some cases the device may have more than one antenna 1440, which may be capable of concurrently transmitting or receiving multiple wireless transmissions.

I/O controller 1445 may manage input and output signals for device 1405. I/O controller 1445 may also manage peripherals not integrated into device 1405. In some cases, I/O controller 1445 may represent a physical connection or port to an external peripheral. In some cases, I/O controller 1445 may utilize an operating system such as iOS®, ANDROID®, MS-DOS®, MS-WINDOWS®, OS/2®, UNIX®, LINUX®, or another known operating system. In other cases, I/O controller 1445 may represent or interact with a modem, a keyboard, a mouse, a touchscreen, or a similar device. In some cases, I/O controller 1445 may be implemented as part of a processor. In some cases, a user may interact with device 1405 via I/O controller 1445 or via hardware components controlled by I/O controller 1445.

Figure 15:
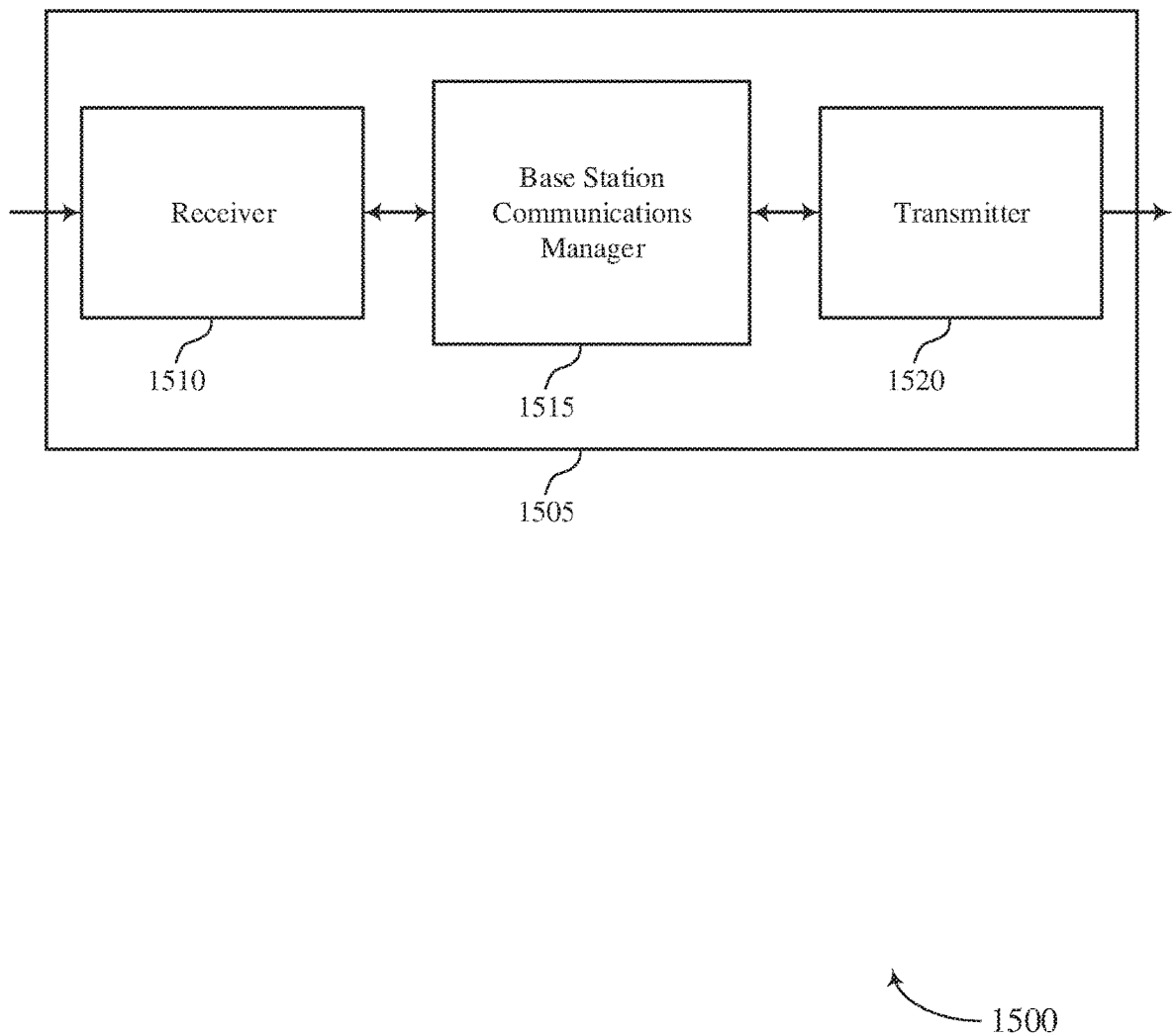
FIGS. 15 through 17 show block diagrams of a device that supports CSI-RS configuration for partial band retuning in accordance with aspects of the present disclosure.

FIG. 15 shows a block diagram 1500 of a wireless device 1505 that supports CSI-RS configuration for partial band retuning in accordance with aspects of the present disclosure. Wireless device 1505 may be an example of aspects of a base station 105 as described herein. Wireless device 1505 may include receiver 1510, base station communications manager 1515, and transmitter 1520. Wireless device 1505 may also include a processor. Each of these components may be in communication with one another (e.g., via one or more buses).

Receiver 1510 may receive information such as packets, user data, or control information associated with various information channels (e.g., control channels, data channels, and information related to CSI-RS configuration for partial band retuning, etc.). Information may be passed on to other components of the device. The receiver 1510 may be an example of aspects of the transceiver 1835 described with reference to FIG. 18. The receiver 1510 may utilize a single antenna or a set of antennas. Base station communications manager 1515 may be an example of aspects of the base station communications manager 1815 described with reference to FIG. 18.

Base station communications manager 1515 and/or at least some of its various sub-components may be implemented in hardware, software executed by a processor, firmware, or any combination thereof. If implemented in software executed by a processor, the functions of the base station communications manager 1515 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The base station communications manager 1515 and/or at least some of its various sub-components may be physically located at various positions, including being distributed such that portions of functions are implemented at different physical locations by one or more physical devices. In some examples, base station communications manager 1515 and/or at least some of its various sub-components may be a separate and distinct component in accordance with various aspects of the present disclosure. In other examples, base station communications manager 1515 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 1515 may transmit a message to a UE indicating, for each partial band of a set of partial bands within a total configured bandwidth of the UE, a set of possible CSI-RS configurations, transmit DCI to the UE, the DCI indicating a set of downlink resources associated with a first partial band of the set of partial bands, select a CSI-RS configuration from the set of possible CSI-RS configurations for the first partial band based on the set of downlink resources, and perform CSI-RS transmissions during the set of downlink resources according to the determined CSI-RS configuration.

Transmitter 1520 may transmit signals generated by other components of the device. In some examples, the transmitter 1520 may be collocated with a receiver 1510 in a transceiver module. For example, the transmitter 1520 may be an example of aspects of the transceiver 1835 described with reference to FIG. 18. The transmitter 1520 may utilize a single antenna or a set of antennas.

Figure 16:
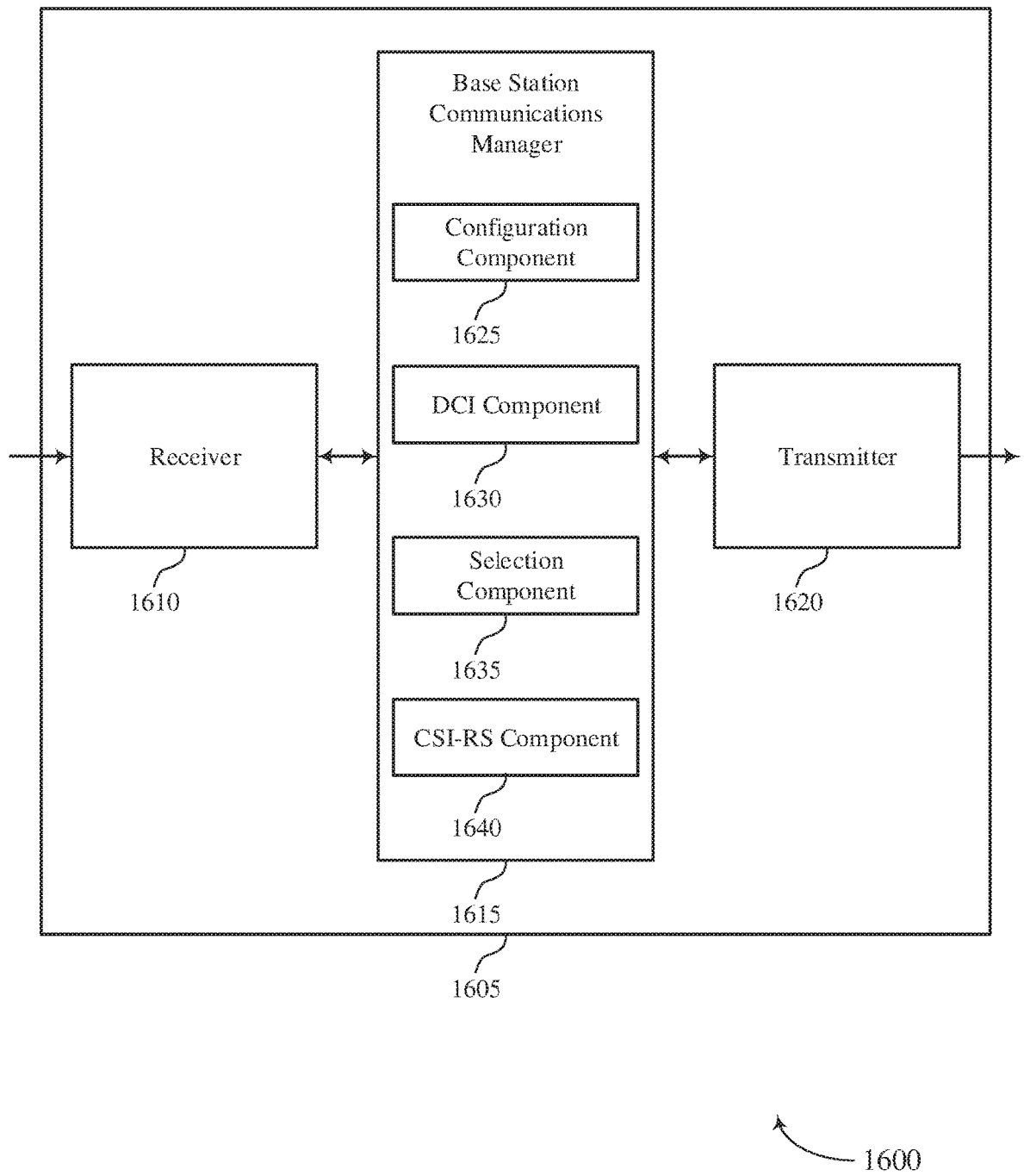

FIG. 16 shows a block diagram 1600 of a wireless device 1605 that supports CSI-RS configuration for partial band retuning in accordance with aspects of the present disclosure. Wireless device 1605 may be an example of aspects of a wireless device 1505 or a base station 105 as described with reference to FIG. 15. Wireless device 1605 may include receiver 1610, base station communications manager 1615, and transmitter 1620. Wireless device 1605 may also include a processor. Each of these components may be in communication with one another (e.g., via one or more buses).

Receiver 1610 may receive information such as packets, user data, or control information associated with various information channels (e.g., control channels, data channels, and information related to CSI-RS configuration for partial band retuning, etc.). Information may be passed on to other components of the device. The receiver 1610 may be an example of aspects of the transceiver 1835 described with reference to FIG. 18. The receiver 1610 may utilize a single antenna or a set of antennas.

Base station communications manager 1615 may be an example of aspects of the base station communications manager 1815 described with reference to FIG. 18. Base station communications manager 1615 may also include configuration component 1625, DCI component 1630, selection component 1635, and CSI-RS component 1640.

Configuration component 1625 may transmit a message to a UE indicating, for each partial band of a set of partial bands within a total configured bandwidth of the UE, a set of possible CSI-RS configurations. In some cases, the transmitted message is a MAC layer message. In some cases, the set of possible CSI-RS configurations includes at least two subsets of possible CSI-RS configurations corresponding to different CSI-RS time-domain characteristics. In some cases, at least one of the subsets of possible CSI-RS configurations corresponds to periodic CSI-RS configurations. In some cases, at least one of the subsets of possible CSI-RS configurations corresponds to aperiodic CSI-RS configurations. In some cases, at least one of the subsets of possible CSI-RS configurations corresponds to semi-persistent CST-RS configurations.

DCI component 1630 may transmit DCI to the UE, the DCI indicating a set of downlink resources associated with a first partial band of the set of partial bands.

Selection component 1635 may select a CSI-RS configuration from the set of possible CSI-RS configurations for the first partial band based on the set of downlink resources and select a CSI-RS configuration from the set of possible CSI-RS configurations for the first partial band based on periodic CSI-RS information in the transmitted message. In some cases, the transmitted message is a RRC message. In some cases, selecting the CSI-RS configuration includes: transmitting an indication of the first CSI-RS configuration in the DCI.

CSI-RS component 1640 may perform CSI-RS transmissions during the set of downlink resources according to the determined CSI-RS configuration, select a CSI-RS configuration from the set of possible CSI-RS configurations for the first partial band based on semi-persistent CSI-RS information in the transmitted message, and receive a CSI report from the UE based on the performed CSI-RS transmission according to the determined CSI-RS configuration. In some cases, at least one CSI-RS configuration of the set of possible CSI-RS configurations corresponds to a zero power (ZP) CSI-RS, and at least one CSI-RS configuration of the set of possible CSI-RS configurations corresponds to a non-zero power (NZP) CSI-RS.

Transmitter 1620 may transmit signals generated by other components of the device. In some examples, the transmitter 1620 may be collocated with a receiver 1610 in a transceiver module. For example, the transmitter 1620 may be an example of aspects of the transceiver 1835 described with reference to FIG. 18. The transmitter 1620 may utilize a single antenna or a set of antennas.

Figure 17:
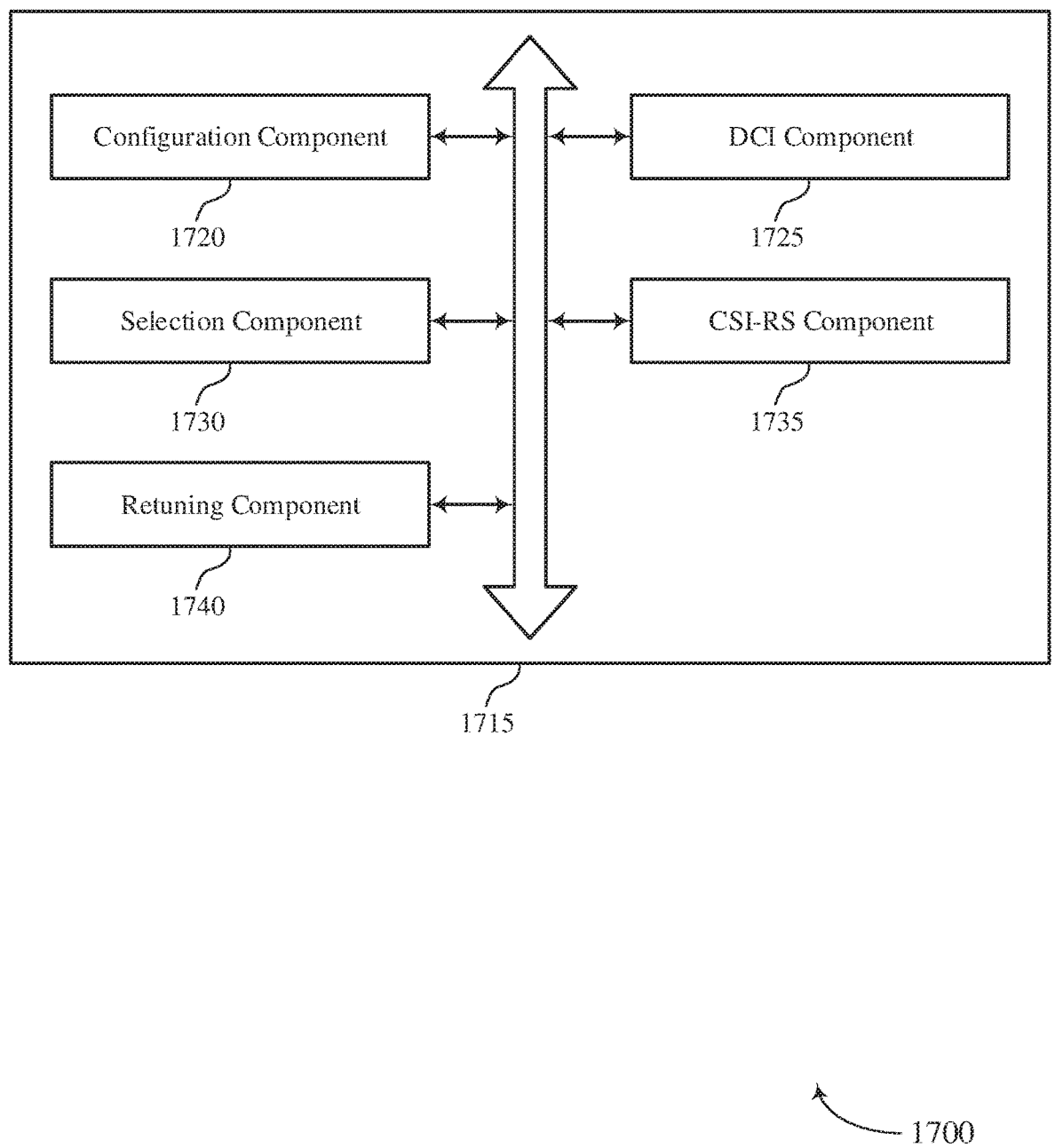

FIG. 17 shows a block diagram 1700 of a base station communications manager 1715 that supports CSI-RS configuration for partial band retuning in accordance with aspects of the present disclosure. The base station communications manager 1715 may be an example of aspects of a base station communications manager 1815 described with reference to FIGS. 15, 16, and 18. The base station communications manager 1715 may include configuration component 1720, DCI component 1725, selection component 1730, CSI-RS component 1735, and retuning component 1740. Each of these modules may communicate, directly or indirectly, with one another (e.g., via one or more buses).

Configuration component 1720 may transmit a message to a UE indicating, for each partial band of a set of partial bands within a total configured bandwidth of the UE, a set of possible CSI-RS configurations. In some cases, the transmitted message is a MAC layer message. In some cases, the set of possible CSI-RS configurations includes at least two subsets of possible CSI-RS configurations corresponding to different CSI-RS time-domain characteristics. In some cases, at least one of the subsets of possible CSI-RS configurations corresponds to periodic CSI-RS configurations. In some cases, at least one of the subsets of possible CSI-RS configurations corresponds to aperiodic CSI-RS configurations. In some cases, at least one of the subsets of possible CSI-RS configurations corresponds to semi-persistent CSI-RS configurations. DCI component 1725 may transmit DCI to the UE, the DCI indicating a set of downlink resources associated with a first partial band of the set of partial bands.

Selection component 1730 may select a CSI-RS configuration from the set of possible CSI-RS configurations for the first partial band based on the set of downlink resources and select a CSI-RS configuration from the set of possible CSI-RS configurations for the first partial band based on periodic CSI-RS information in the transmitted message. In some cases, the transmitted message is a RRC message. In some cases, selecting the CSI-RS configuration includes: transmitting an indication of the first CSI-RS configuration in the DCI.

CSI-RS component 1735 may perform CSI-RS transmissions during the set of downlink resources according to the determined CSI-RS configuration, select a CSI-RS configuration from the set of possible CSI-RS configurations for the first partial band based on semi-persistent CSI-RS information in the transmitted message, and receive a CSI report from the UE based on the performed CSI-RS transmission according to the determined CSI-RS configuration. In some cases, at least one CSI-RS configuration of the set of possible CSI-RS configurations corresponds to a zero power (ZP) CSI-RS, and at least one CSI-RS configuration of the set of possible CSI-RS configurations corresponds to a non-zero power (NZP) CSI-RS. Retuning component 1740 may transmit instructions to retune a receiver of the UE to the first partial band from a second partial band based via the DCI.

Figure 18:
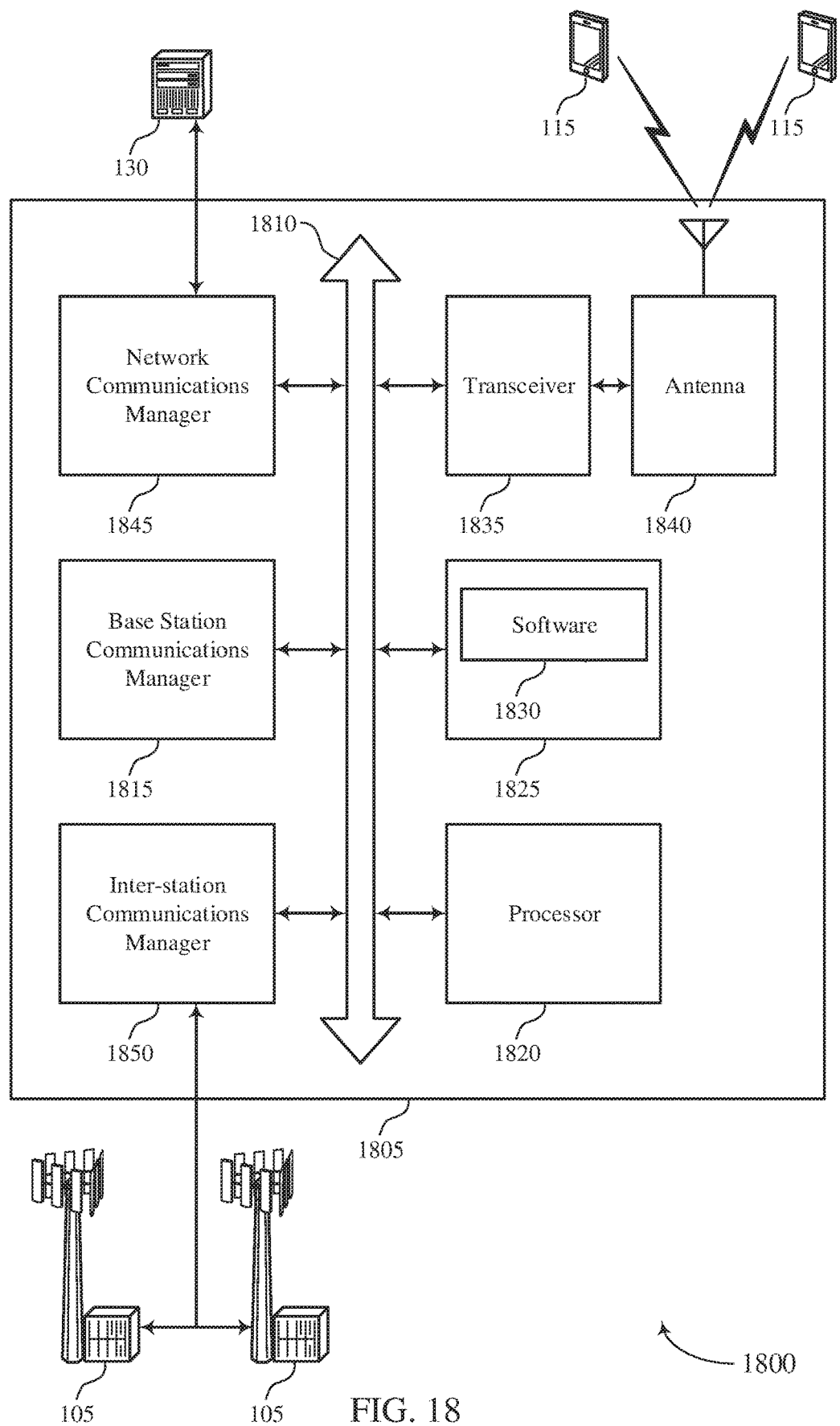
FIG. 18 illustrates a block diagram of a system including a base station that supports CSI-RS configuration for partial band retuning in accordance with aspects of the present disclosure.

FIG. 18 shows a diagram of a system 1800 including a device 1805 that supports CSI-RS configuration for partial band retuning in accordance with aspects of the present disclosure. Device 1805 may be an example of or include the components of base station 105 as described above, e.g., with reference to FIG. 1. Device 1805 may include components for bi-directional voice and data communications including components for transmitting and receiving communications, including base station communications manager 1815, processor 1820, memory 1825, software 1830, transceiver 1835, antenna 1840, network communications manager 1845, and inter-station communications manager 1850. These components may be in electronic communication via one or more buses (e.g., bus 1810). Device 1805 may communicate wirelessly with one or more UEs 115.

Processor 1820 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1820 may be configured to operate a memory array using a memory controller. In other cases, a memory controller may be integrated into processor 1820. Processor 1820 may be configured to execute computer-readable instructions stored in a memory to perform various functions (e.g., functions or tasks supporting CSI-RS configuration for partial band retuning).

Memory 1825 may include RAM and ROM. The memory 1825 may store computer-readable, computer-executable software 1830 including instructions that, when executed, cause the processor to perform various functions described herein. In some cases, the memory 1825 may contain, among other things, a BIOS which may control basic hardware or software operation such as the interaction with peripheral components or devices.

Software 1830 may include code to implement aspects of the present disclosure, including code to support CSI-RS configuration for partial band retuning. Software 1830 may be stored in a non-transitory computer-readable medium such as system memory or other memory. In some cases, the software 1830 may not be directly executable by the processor but may cause a computer (e.g., when compiled and executed) to perform functions described herein.

Transceiver 1835 may communicate bi-directionally, via one or more antennas, wired, or wireless links as described above. For example, the transceiver 1835 may represent a wireless transceiver and may communicate bi-directionally with another wireless transceiver. The transceiver 1835 may also include a modem to modulate the packets and provide the modulated packets to the antennas for transmission, and to demodulate packets received from the antennas. In some cases, the wireless device may include a single antenna 1840. However, in some cases the device may have more than one antenna 1840, which may be capable of concurrently transmitting or receiving multiple wireless transmissions.

Network communications manager 1845 may manage communications with the core network (e.g., via one or more wired backhaul links). For example, the network communications manager 1845 may manage the transfer of data communications for client devices, such as one or more UEs 115.

Inter-station communications manager 1850 may manage communications with other base station 105, and may include a controller or scheduler for controlling communications with UEs 115 in cooperation with other base stations 105. For example, the inter-station communications manager 1850 may coordinate scheduling for transmissions to UEs 115 for various interference mitigation techniques such as beamforming or joint transmission. In some examples, inter-station communications manager 1850 may provide an X2 interface within an Long Term Evolution (LTE)/LTE-A wireless communication network technology to provide communication between base stations 105.

Figure 19:
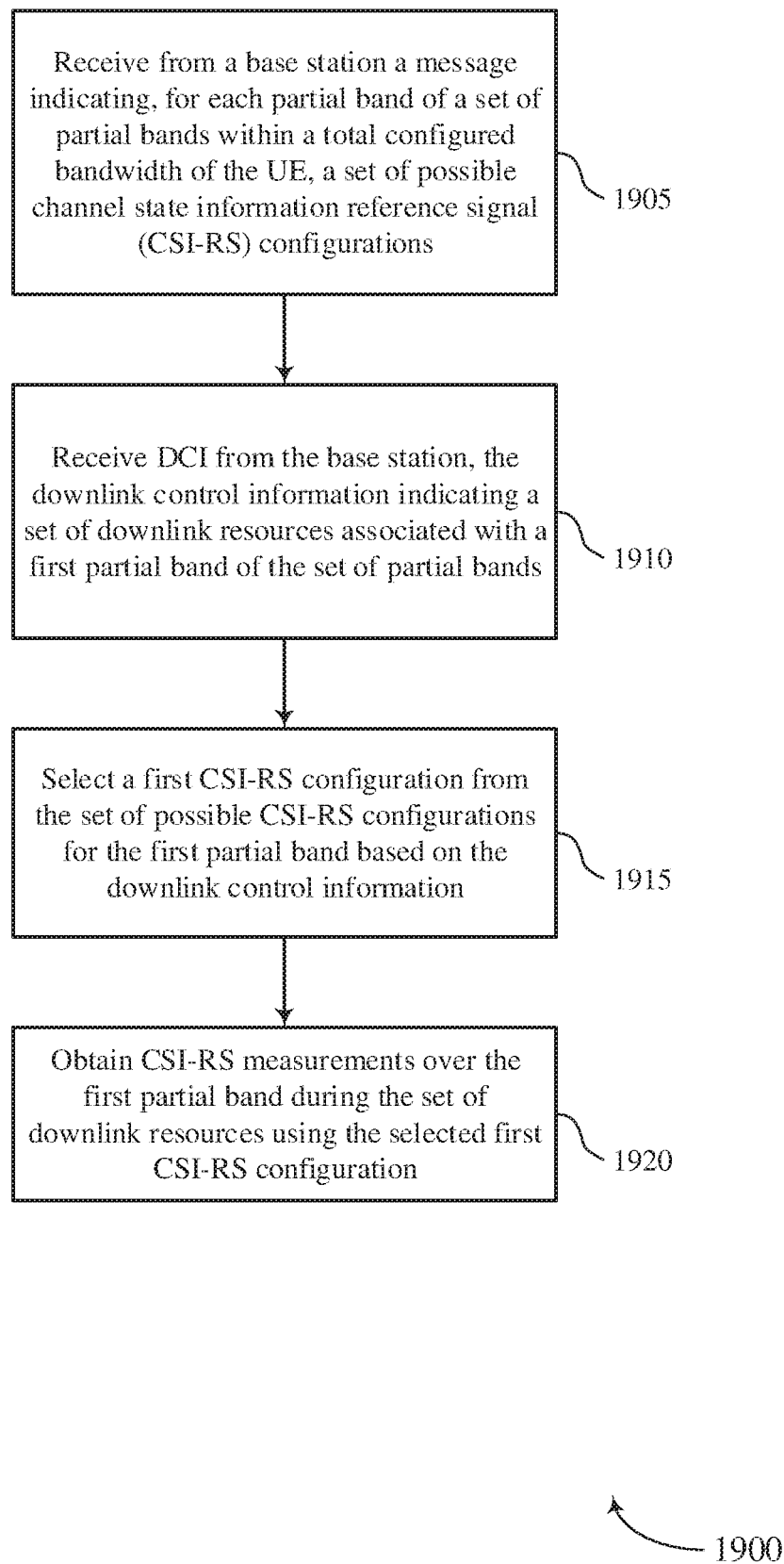
FIGS. 19 through 21 illustrate methods for CSI-RS configuration for partial band retuning in accordance with aspects of the present disclosure.

FIG. 19 shows a flowchart illustrating a method 1900 for CSI-RS configuration for partial band retuning in accordance with aspects of the present disclosure. The operations of method 1900 may be implemented by a UE 115 or its components as described herein. For example, the operations of method 1900 may be performed by a UE communications manager as described with reference to FIGS. 11 through 14. In some examples, a UE 115 may execute a set of codes to control the functional elements of the device to perform the functions described below. Additionally or alternatively, the UE 115 may perform aspects of the functions described below using special-purpose hardware.

At block 1905 the UE 115 may receive from a base station a message indicating, for each partial band of a plurality of partial bands within a total configured bandwidth of the UE, a set of possible CSI-RS configurations. The operations of block 1905 may be performed according to the methods described herein. In certain examples, aspects of the operations of block 1905 may be performed by a configuration component as described with reference to FIGS. 1I through 14.

At block 1910 the UE 115 may receive DCI from the base station, the DCI indicating a set of downlink resources associated with a first partial band of the plurality of partial bands. The operations of block 1910 may be performed according to the methods described herein. In certain examples, aspects of the operations of block 1910 may be performed by a DCI component as described with reference to FIGS. 11 through 14.

At block 1915 the UE 115 may select a first CSI-RS configuration from the set of possible CSI-RS configurations for the first partial band based at least in part on the DCI. The operations of block 1915 may be performed according to the methods described herein. In certain examples, aspects of the operations of block 1915 may be performed by a selection component as described with reference to FIGS. 11 through 14.

At block 1920 the UE 115 may obtain CSI-RS measurements over the first partial band during the set of downlink resources using the selected first CSI-RS configuration. The operations of block 1920 may be performed according to the methods described herein. In certain examples, aspects of the operations of block 1920 may be performed by a measurement component as described with reference to FIGS. 11 through 14.

Figure 20:
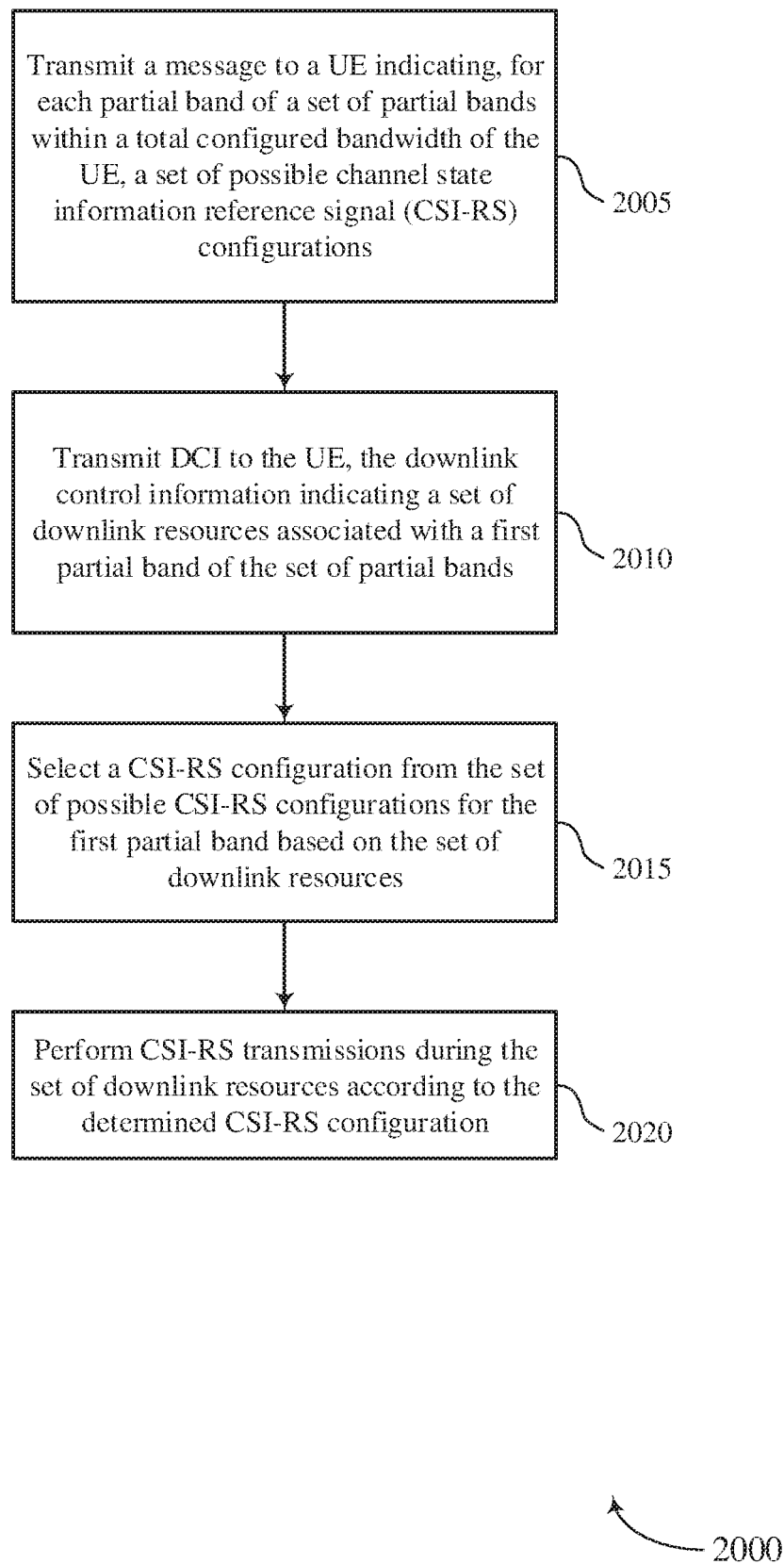

FIG. 20 shows a flowchart illustrating a method 2000 for CSI-RS configuration for partial band retuning in accordance with aspects of the present disclosure. The operations of method 2000 may be implemented by a base station 105 or its components as described herein. For example, the operations of method 2000 may be performed by a base station communications manager as described with reference to FIGS. 15 through 18. In some examples, a base station 105 may execute a set of codes to control the functional elements of the device to perform the functions described below. Additionally or alternatively, the base station 105 may perform aspects of the functions described below using special-purpose hardware.

At block 2005 the base station 105 may transmit a message to a user equipment (UE) indicating, for each partial band of a plurality of partial bands within a total configured bandwidth of the UE, a set of possible CSI-RS configurations. The operations of block 2005 may be performed according to the methods described herein. In certain examples, aspects of the operations of block 2005 may be performed by a configuration component as described with reference to FIGS. 15 through 18.

At block 2010 the base station 105 may transmit DCI to the UE, the DCI indicating a set of downlink resources associated with a first partial band of the plurality of partial bands. The operations of block 2010 may be performed according to the methods described herein. In certain examples, aspects of the operations of block 2010 may be performed by a DCI component as described with reference to FIGS. 15 through 18.

At block 2015 the base station 105 may select a CSI-RS configuration from the set of possible CSI-RS configurations for the first partial band based at least in part on the set of downlink resources. The operations of block 2015 may be performed according to the methods described herein. In certain examples, aspects of the operations of block 2015 may be performed by a selection component as described with reference to FIGS. 15 through 18.

At block 2020 the base station 105 may perform CSI-RS transmissions during the set of downlink resources according to the determined CSI-RS configuration. The operations of block 2020 may be performed according to the methods described herein. In certain examples, aspects of the operations of block 2020 may be performed by a CSI-RS component as described with reference to FIGS. 15 through 18.

Figure 21:
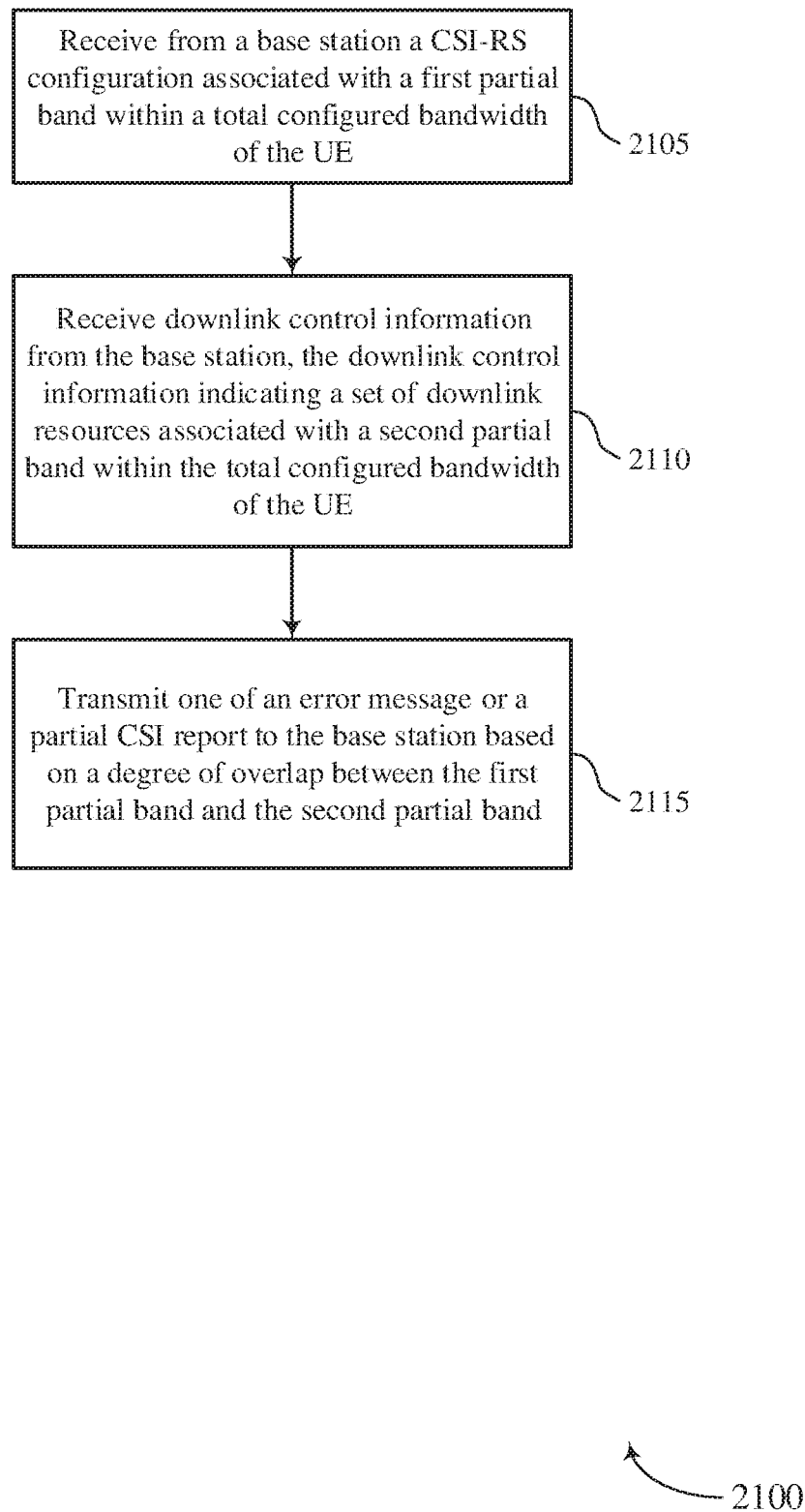

FIG. 21 shows a flowchart illustrating a method 2100 for CSI-RS configuration for partial band retuning in accordance with aspects of the present disclosure. The operations of method 2100 may be implemented by a UE 115 or its components as described herein. For example, the operations of method 2100 may be performed by a UE communications manager as described with reference to FIGS. 11 through 14. In some examples, a UE 115 may execute a set of codes to control the functional elements of the device to perform the functions described below. Additionally or alternatively, the UE 115 may perform aspects of the functions described below using special-purpose hardware.

At block 2105 the UE 115 may receive from a base station a CSI-RS configuration associated with a first partial band within a total configured bandwidth of the UE. The operations of block 2105 may be performed according to the methods described herein. In certain examples, aspects of the operations of block 2105 may be performed by a configuration component as described with reference to FIGS. 11 through 14.

At block 2110 the UE 115 may receive DCI from the base station, the DCI indicating a set of downlink resources associated with a second partial band within the total configured bandwidth of the UE. The operations of block 2110 may be performed according to the methods described herein. In certain examples, aspects of the operations of block 2110 may be performed by a DCI component as described with reference to FIGS. 11 through 14.

At block 2115 the UE 115 may transmit one of an error message or a partial CSI report to the base station based at least in part on a degree of overlap between the first partial band and the second partial band. The operations of block 2115 may be performed according to the methods described herein. In certain examples, aspects of the operations of block 2115 may be performed by an overlap determination component as described with reference to FIGS. 11 through 14.

It should be noted that the methods described above describe possible implementations, and that the operations and the steps may be rearranged or otherwise modified and that other implementations are possible. In some examples, aspects from two or more of the methods 1900, 2000, or 2100 described with reference to FIG. 19, 20, or 21 may be combined. It should be noted that the methods 1900, 2000, and 2100 are just example implementations, and that the operations of the methods 1900, 2000, or 2100 may be rearranged or otherwise modified such that other implementations are possible.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of eNBs provide coverage for various geographical regions. For example, each eNB, next generation NodeB (gNB), or base station may provide communication coverage for a macro cell, a small cell, or other types of cell. The term "cell" may be used to describe a base station, a carrier or component carrier associated with a base station, or a geographic coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), gNB, Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates an inclusive list such that, for example, a phrase referring to "at least one of" a list of items refers to any combination of those items, including single members. As an example, "at least one of: A, B, or C" is intended to cover A, B, C, A-B, A-C, B-C, and A-B-C, as well as any combination with multiples of the same element (e.g., A-A A-A-A, A-A-B, A-A-C, A-B-B, A-C-C, B-B, B-B-B, B-B-C, C-C, and C-C-C or any other ordering of A, B, and C).

Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   receiving from an access network entity a radio resource control (RRC) message indicating a set of two or more possible channel state information reference signal (CSI-RS) configurations for a partial band of a plurality of partial bands within a total configured bandwidth of the UE;
   receiving downlink control information (DCI) from the access network entity, the DCI indicating a set of downlink resources associated with a first partial band of the plurality of partial bands;
   selecting a first CSI-RS configuration from the set of two or more possible CSI-RS configurations for the first partial band based at least in part on the DCI; and
   obtaining CSI measurements over the set of downlink resources in the first partial band using the selected first CSI-RS configuration.

2. The method of claim 1, further comprising:
   retuning a receiver of the UE to the first partial band from a second partial band based at least in part on the received DCI.

3. The method of any one of claim 1 or claim 2, further comprising:
   selecting one or more CSI-RS configurations from the set of two or more possible CSI-RS configurations for the first partial band based at least in part on periodic CSI-RS information in the received RRC message.

4. The method of claim 1, further comprising:
   selecting one or more configurations from the set of two or more possible CSI-RS configurations for the first partial band based at least in part on semi-persistent CSI-RS information in the received RRC message.

5. The method of claim 4, wherein selecting the one or more CSI-RS configurations comprises:
   receiving an indication of the first CSI-RS configuration in the DCI.

6. The method of claim 1, further comprising:
   receiving a media access control (MAC) layer message.

7. The method of claim 6, further comprising:
   transmitting a channel state information (CSI) report to the access network entity based at least in part on the CSI-RS measurements over the first partial band.

8. The method of claim 6, wherein at least one CSI-RS configuration of the set of two or more possible CSI-RS configurations corresponds to a zero power (ZP) CSI-RS, and at least one CSI-RS configuration of the set of two or more possible CSI-RS configurations corresponds to a non-zero power (NZP) CSI-RS.

9. The method of claim 1, wherein the set of two or more possible CSI-RS configurations comprises at least two subsets of possible CSI-RS configurations corresponding to different CSI-RS time-domain characteristics.

10. The method of claim 9, wherein at least one of the subsets of possible CSI-RS configurations corresponds to periodic CSI-RS configurations.

11. The method of claim 9, wherein at least one of the subsets of possible CSI-RS configurations corresponds to aperiodic CSI-RS configurations.

12. The method of claim 9, wherein at least one of the subsets of possible CSI-RS configurations corresponds to semi-persistent CSI-RS configurations.

13. A method for wireless communication, comprising:
transmitting a radio resource control (RRC) message to a user equipment (UE) indicating a set of two or more possible channel state information reference signal (CSI-RS) configurations for a partial band of a plurality of partial bands within a total configured bandwidth of the UE;
transmitting downlink control information (DCI) to the UE, the DCI indicating a set of downlink resources associated with a first partial band of the plurality of partial bands;
selecting a CSI-RS configuration from the set of two or more possible CSI-RS configurations for the first partial band based at least in part on the set of downlink resources; and
performing CSI-RS transmissions during the set of downlink resources in the first partial band according to the selected CSI-RS configuration.

14. The method of claim 13, further comprising:
transmitting instructions to retune a receiver of the UE to the first partial band from a second partial band based on the DCI.

15. The method of claim 13, further comprising:
selecting a CSI-RS configuration from the set of two or more possible CSI-RS configurations for the first partial band based at least in part on periodic CSI-RS information in the transmitted RRC message.

16. The method of claim 13, further comprising:
selecting a CSI-RS configuration from the set of two or more possible CSI-RS configurations for the first partial band based at least in part on semi-persistent CSI-RS information in the transmitted RRC message.

17. The method of claim 13, further comprising:
transmitting a media access control (MAC) layer message.

18. The method of claim 13, wherein selecting the CSI-RS configuration comprises:
transmitting an indication of the first CSI-RS configuration in the DCI.

19. The method of claim 14, further comprising:
receiving a channel state information (CSI) report from the UE based at least in part on the performed CSI-RS transmission according to the selected CSI-RS configuration.

20. The method of claim 13, wherein at least one CSI-RS configuration of the set of two or more possible CSI-RS configurations corresponds to a zero power (ZP) CSI-RS, and at least one CSI-RS configuration of the set of two or more possible CSI-RS configurations corresponds to a non-zero power (NZP) CSI-RS.

21. The method of claim 13, wherein the set of two or more possible CSI-RS configurations comprises at least two subsets of possible CSI-RS configurations corresponding to different CSI-RS time-domain characteristics.

22. The method of claim 21, wherein at least one of the subsets of possible CSI-RS configurations corresponds to periodic CSI-RS configurations.

23. The method of claim 21, wherein at least one of the subsets of possible CSI-RS configurations corresponds to aperiodic CSI-RS configurations.

24. The method of claim 21, wherein at least one of the subsets of possible CSI-RS configurations corresponds to semi-persistent CSI-RS configurations.

25. A method for wireless communication at a user equipment (UE), comprising:
receiving from an access network entity a CSI-RS configuration associated with a first partial band within a total configured bandwidth of the UE;
receiving downlink control information (DCI) from the access network entity, the DCI indicating a set of downlink resources associated with a second partial band within the total configured bandwidth of the UE; and
transmitting, to the access network entity, a partial CSI report, wherein there is a degree of overlap between frequency resources of the first partial band and frequency resources of the second partial band, and the partial CSI report comprises partial CSI-RS measurements taken over overlapping frequency resources of the first partial band and the second partial band.

26. The method of claim 25, further comprising:
determining that a third partial band and a fourth partial band do not overlap; and
transmitting an error message based at least in part on the determining.

27. The method of claim 25, further comprising:
determining a portion of the first partial band that overlaps with the second partial band; and
obtaining CSI-RS measurements over the portion of the first partial band that overlaps with the second partial band.

28. An apparatus for wireless communication at a user equipment (UE), comprising:
a processor;
memory in electronic communication with the processor; and
instructions stored in the memory and operable, when executed by the processor, to cause the apparatus to:
receive from a access network entity a radio resource control (RRC) message indicating a set of two or more possible channel state information reference signals (CSI-RS) configurations for a partial band of a plurality of partial bands within a total configured bandwidth of the UE;
receive downlink control information (DCI) from the access network entity, the DCI indicating a set of downlink resources associated with a first partial band of the plurality of partial bands;
select a first CSI-RS configuration from the set of two or more possible CSI-RS configurations for the first partial band based at least in part on the DCI; and
obtain CSI measurements over the set of downlink resources in the first partial band using the selected first CSI-RS configuration.

* * * * *